(12) United States Patent
Buttgenbach et al.

(10) Patent No.: US 11,489,337 B1
(45) Date of Patent: Nov. 1, 2022

(54) SYSTEMS AND METHODS FOR MICROUTILITY METERING AND ENERGY ALLOCATION

(71) Applicant: 8ME NOVA, LLC, El Dorado Hills, CA (US)

(72) Inventors: Thomas Buttgenbach, Santa Monica, CA (US); Finbar Sheehy, San Francisco, CA (US)

(73) Assignee: 8ME NOVA, LLC, El Dorado Hills, CA (US)

( * ) Notice: Subject to any disclaimer, the term of this patent is extended or adjusted under 35 U.S.C. 154(b) by 0 days.

(21) Appl. No.: 17/850,502

(22) Filed: Jun. 27, 2022

Related U.S. Application Data

(63) Continuation of application No. 17/697,665, filed on Mar. 17, 2022, now Pat. No. 11,431,169.

(60) Provisional application No. 63/235,278, filed on Aug. 20, 2021.

(51) Int. Cl.
*H02J 3/00* (2006.01)
*H02J 3/38* (2006.01)

(52) U.S. Cl.
CPC .............. *H02J 3/003* (2020.01); *H02J 3/004* (2020.01); *H02J 3/381* (2013.01); *H02J 2203/10* (2020.01); *H02J 2300/24* (2020.01); *H02J 2300/28* (2020.01)

(58) Field of Classification Search
CPC .. H02J 3/003; H02J 3/004; H02J 3/381; H02J 2300/24; H02J 2300/28; H02J 2203/10
USPC .......................................................... 307/38
See application file for complete search history.

(56) References Cited

U.S. PATENT DOCUMENTS

| | | | |
|---|---|---|---|
| 11,398,729 B1 * | 7/2022 | Upreti | .................... H02J 3/144 |
| 2019/0036340 A1 | 1/2019 | Meeker et al. | |

* cited by examiner

*Primary Examiner* — Hal Kaplan
(74) *Attorney, Agent, or Firm* — Foley & Lardner LLP

(57) ABSTRACT

The present disclosure provides systems and methods for managing electrical energy generated by a renewable microgrid. One or more processors of a system may store priorities for one or more consumer loads; forecast an amount of available electrical energy for a time period; allocate a first electrical energy amount to a first consumer load to a first energy limit for the time period; determine more electrical energy is forecast to be available from the RES or the ESS for the time period; identify a second consumer load of the one or more consumer loads; allocate a second electrical energy amount to the second consumer load for the time period; and direct electrical energy from the RES or the ESS to the first and second consumer loads according to the allocations.

20 Claims, 16 Drawing Sheets

SYSTEMS AND METHODS FOR MICROUTILITY METERING AND ENERGY ALLOCATION

CROSS-REFERENCE TO RELATED APPLICATIONS

This application claims the benefit of priority as a continuation to U.S. patent application Ser. No. 17/697,665, filed Mar. 17, 2022, which claims the benefit of priority to U.S. Provisional Application No. 63/235,278, filed Aug. 20, 2021, the entirety of each of which is incorporated by reference herein.

BACKGROUND

Microgrids are electricity generation and distribution systems generally serving a relatively small number of customers in a localized area, such as a residential community, a commercial or industrial electrical load, a refugee camp, a military base, etc. A microgrid may be islanded, i.e., entirely electrically self-contained, or may be connected to a larger electrical grid from which it can draw power if the electrical load on the microgrid exceeds the microgrid's own generating capacity. As used herein, microgrid can refer to a micro utility.

Renewable microgrids are microgrids in which a significant portion of the electrical generation comes from renewable resources. Because of the intermittent nature of renewable power sources such as solar or wind power, renewable microgrids often have a means of supplementing the renewable generation when needed. The supplementation may be a fossil fuel-fired generator, a connection to a larger electrical grid, or both.

All-renewable islanded microgrids are relatively uncommon because experience and analysis have shown very high cost would be incurred to serve a given load with near-perfect reliability compared to a renewable microgrid with means of supplementing the renewable generation. An alternative to supplementing the renewable generation could be to manage (e.g., curtail) the electrical loads on the grid to ensure they do not exceed the capacity of the energy resources. However, current renewable microgrids lack the capability to meet a consumer demand by load management.

SUMMARY

In one aspect, the present disclosure provides a system for managing electrical energy generated by a renewable microgrid. The system may comprise one or more computer processors operatively coupled to computer memory and configured by machine-readable instructions to store priorities for one or more consumer loads in the computer memory; forecast an amount of electrical energy available from a renewable energy system (RES) and an energy storage system (ESS) for a time period; allocate a first electrical energy amount to a first consumer load of the one or more consumer loads to a first energy limit of the first consumer load for the time period responsive to the first consumer load having a highest stored priority of the one or more consumer loads; responsive to the allocating the first electrical energy to the first consumer load to the first energy limit, determine more electrical energy is forecast to be available from the RES or the ESS for the time period; identify a second consumer load of the one or more consumer loads responsive to the second consumer load having a second highest priority of the one or more consumer loads; allocate a second electrical energy amount to the second consumer load for the time period responsive to the identification of the second consumer load and the determination that there is more electrical energy available from the RES or the ESS for the time period; and direct electrical energy from the RES or the ESS to the first and second consumer loads according to the allocations.

In some embodiments, the one or more computer processors are further configured by the machine-readable instructions to determine a priority for each of the one or more consumer loads based on prioritization criteria. In some embodiments, the one or more computer processors are configured by the machine-readable instructions to determine the priority for each of the one or more consumer loads by determining the priority based on pricing tiers, determinations of need, household/building size, type of home/building, geographic location of the home/building, demographic information, or other similar systems of each of the one or more consumer loads.

In some embodiments, the one or more computer processors are configured by the machine-readable instruction to determine the priority for each of the one or more consumer loads by determining the priority based on a type of each of the one or more consumer loads.

In some embodiments, the one or more computer processors are configured by the machine-readable instruction to determine the priority for each of the one or more consumer loads by assigning consumer loads that correspond to medical facilities that contain temperature-sensitive medications or supplies a higher priority than all other consumer loads of the one or more consumer loads. In some embodiments, the one or more computer processors are further configured by the machine-readable instruction to determine the priority for each of the one or more consumer loads by assigning consumer loads that correspond to critical infrastructure as a next highest priority after the consumer loads that correspond to medical facilities that contain temperature-sensitive medications or supplies.

In some embodiments, the one or more computer processors are configured by the machine-readable instructions to determine the priority for each of the one or more consumer loads based on values that are associated with each of the one or more consumer loads. In some embodiments, the one or more computer processors are further configured by the machine-readable instructions to determine the forecast amount of electrical energy is not enough to allocate enough electrical energy to the second consumer load for the time period; and responsive to the determination, allocate an electrical energy amount of zero to each consumer load of the one or more consumer loads that has a priority that is lower than the priority of the second consumer load. In some embodiments, the one or more computer processors are configured by the machine-readable instructions to allocate the first electrical energy amount to the first consumer load by storing an indication of the first electrical energy amount in the computer memory.

In some embodiments, the one or more computer processors are further configured by the machine-readable instruction to determine a third priority for a third consumer load is identical to a fourth priority for a fourth consumer load; responsive to the determination that the third priority is identical to the fourth priority, calculate a third electrical energy amount that is equal to a fourth electrical energy amount; and allocate the third electrical energy amount to the third consumer load for the time period and the fourth electrical energy amount to the fourth consumer load for the time period.

In some embodiments, the one or more computer processors are further configured by the machine-readable instructions to determine the forecast amount of electrical energy is not enough to allocate enough electrical energy to the second consumer load for the time period; and reduce a previously assigned energy limit for each of the one or more consumer loads responsive to the determination. In some embodiments, the one or more computer processors are configured by the machine-readable instruction to reduce the previously assigned energy limit for each of the one or more consumer loads based on the priorities of the one or more consumer loads.

In some embodiments, the one or more computer processors are configured by the machine-readable instructions to, during the time period: determine the first energy limit is higher than an amount of energy the first consumer load will utilize during the time period; calculate an excess energy by calculating a difference between the first energy limit and the amount of energy the first consumer load will utilize during the time period; and allocate the excess energy to other consumer loads of the one or more consumer loads. In some embodiments, the one or more computer processors are configured by the machine-readable instructions to allocate the excess energy to other consumer loads by increasing the allocated second electrical energy amount until the second electrical energy amount reaches a second energy limit. In some embodiments, the one or more computer processors are configured by the machine-readable instructions to transmit a message to a device associated with a user of the first consumer load, the message comprising a string indicating the first consumer is on track to use less energy than the allocated first electrical energy amount.

In some embodiments, the one or more computer processors are configured by the machine-readable instructions to, during the time period: determine an amount of energy that has been directed to the first consumer load has reached the first energy limit; and terminate distribution of energy to the first consumer load responsive to the determination. In some embodiments, the one or more computer processors are configured by the machine-readable instructions to, during the time period: determine an amount of energy that has been directed to the first consumer load is within a threshold of the allocated first electrical energy amount; and responsive to the determination, transmit a message to a device associated with a user of the first consumer load, the message comprising a string indicating to utilize less energy for a remainder of the time period.

In another aspect, the present disclosure describes a method for managing electrical energy generated by a renewable microgrid comprising a renewable energy system ("RES") and an energy storage system ("ESS"). The method may comprise storing priorities for one or more consumer loads in a computer memory; forecasting an amount of electrical energy available from the RES and the ESS for a time period; allocating a first electrical energy amount to a first consumer load of the one or more consumer loads to a first energy limit of the first consumer load for the time period responsive to the first consumer load having a highest stored priority of the one or more consumer loads; responsive to the allocating the first electrical energy amount to the first consumer load to the first energy limit, determining more electrical energy is forecast to be available from the RES or the ESS for the time period; identifying a second consumer load of the one or more consumer loads responsive to the second consumer load having a second highest priority of the one or more consumer loads; allocating a second electrical energy amount to the second consumer load for the time period responsive to the identification of the second consumer load and the determination that there is more electrical energy available from the RES or the ESS for the time period; and directing electrical energy from the RES or the ESS to the first and second consumer loads according to the allocations.

In some embodiments, the method further comprises determining a priority for each of the one or more consumer loads based on prioritization criteria. In some embodiments, determining the priority for each of the one or more consumer loads comprises determining the priority based on a type of each of the one or more consumer loads.

In some embodiments, determining the priority for each of the one or more consumer loads comprises assigning consumer loads that correspond to medical facilities that contain temperature-sensitive medications or supplies a higher priority than all other consumer loads of the one or more consumer loads. In some embodiments, determining the priority for each of the one or more consumer loads comprises assigning consumer loads that correspond to critical infrastructure as a next highest priority after the consumer loads that correspond to medical facilities that contain temperature-sensitive medications or supplies. In some embodiments, determining the priority for each of the one or more consumer loads comprises determining the priority for each of the one or more consumer loads based on values that are associated with each of the one or more consumer loads.

In another aspect, the present disclosure describes one or more non-transitory computer storage media storing instructions that are operable, when executed by one or more computers, to cause said one or more computers to perform operations comprising storing priorities for one or more consumer loads in a computer memory; forecasting an amount of electrical energy available from a renewable energy system (RES) and an energy storage system (ESS) for a time period; allocating a first electrical energy amount to a first consumer load of the one or more consumer loads to a first energy limit of the first consumer load for the time period responsive to the first consumer load having a highest stored priority of the one or more consumer loads; responsive to the allocating the first electrical energy amount to the first consumer load to the first energy limit, determining more electrical energy is forecast to be available from the RES or the ESS for the time period; identifying a second consumer load of the one or more consumer loads responsive to the second consumer load having a second highest priority of the one or more consumer loads; allocating a second electrical energy amount to the second consumer load for the time period responsive to the identification of the second consumer load and the determination that there is more electrical energy available from the RES or the ESS for the time period; and directing electrical energy from the RES or the ESS to the first and second consumer loads according to the allocations.

The present disclosure provides systems and methods for managing electrical energy generated by a renewable microgrid. In some embodiments of the present disclosure, the system comprises a renewable energy system configured to generate electrical energy from a renewable energy source ("RES"). The RES may be a solar photovoltaic (PV) array comprising solar cells or a wind farm comprising wind turbines. The system may comprise an energy storage system ("ESS") configured to store energy from the RES. The ESS may be a battery energy storage system ("BESS"). The system may comprise an energy management system configured to direct electrical energy from the RES to one or more consumer loads, from the RES to the ESS, or from the ESS to the one or more consumer loads. The EMS may be configured to deliver energy from the RES and to or from the ESS depending on the electrical energy generation of the RES. The system may comprise one or more active meters communicatively coupled to the one or more consumer loads. As described herein, an active meter is a device (e.g., a device comprising a processor and memory) capable of measuring energy consumption and capable of processing and responding to that measurement, for example by determining that a piece of energy-consuming equipment is about to exceed its allocation limit and signaling to the equipment that it should shut down or limit its energy consumption. In another example, an active meter may cut off energy flow to the equipment (if the equipment is not capable of responding to signaling). The one or more active meters may be configured to monitor energy consumption of the one or more consumer loads. The one or more active meters may communicate information about the energy consumption of the one or more consumer loads to an energy forecast and allocation system ("EFAS"). The one or more active meters may be configured to disconnect energy flow to a consumer load. The one or more active meters may disconnect energy flow to one or more devices of a consumer load comprising a plurality of devices. The system may comprise an EFAS communicatively coupled to the EMS and one or more active meters. The EFAS may be programmed to: (i) forecast an amount of electrical energy available from the RES and ESS for a plurality of time periods, and (ii) allocate, for each of the plurality of time periods, a maximum energy limit available to each of the one or more consumer loads. The EFAS may forecast the energy consumption of the one or more consumer loads. The EFAS may determine when a consumer load is predicted to exceed or stay below a maximum energy limit. The EFAS may communicate with a user of a consumer load when the consumer load is predicted to exceed or stay below the maximum energy limit. The EFAS may communicate an energy reduction plan to a user of a consumer load when the consumer load is predicted to exceed the maximum energy limit. When a consumer load is predicted to stay below the maximum energy limit, the EFAS may allow the user of the consumer load to (i) offer the excess energy for sale to the renewable microgrid, or (ii) offer the excess energy for sale to other users of the one or more consumer loads.

The system described above can allow an islanded renewable microgrid to manage the electrical energy generated by a RES to sufficiently provide energy to consumers of the renewable microgrid without the need of a supplemental energy source. Monitoring the energy consumption of each of the consumer loads, coupled with the ability to disconnect or reduce energy flow to the consumer loads, allows the system to ensure that any one consumer load does not jeopardize the available energy left for the remaining consumer loads. The ability of the EFAS to communicate with users of the consumer loads provides a system of efficient energy management to ensure that consumer loads do not exceed their maximum energy limit. Thus, the system improves the efficiency of islanded renewable microgrids and allows them to provide energy to consumer loads reliably without the need of a supplemental energy supply.

In an aspect, the present disclosure provides a system for managing electrical energy generated by a renewable microgrid. The system comprises: an energy management system ("EMS") configured to direct electrical energy (1) from a renewable energy system ("RES") to one or more consumer loads, (2) from the RES to an energy storage system ("ESS"), or (3) from the ESS to the one or more consumer loads; and an energy forecasting and allocation system ("EFAS") communicatively coupled to the EMS and one or more active meters for monitoring energy consumption of the one or more consumer loads, wherein the EFAS is programmed to: forecast an amount of electrical energy available from the RES and the ESS for a plurality of time periods; and allocate, for each of the plurality of time periods, a maximum energy limit available to each of the one or more consumer loads.

In some embodiments, the RES is configured to generate the electrical energy from a renewable energy source comprising solar or wind. In some embodiments, the ESS comprises one or more batteries. In some embodiments, the ESS comprises a maximum charge limit, a minimum charge limit, and a state of charge. In some cases, the EMS is configured to reduce the electrical energy generation of the RES to match a demand from the one or more consumer loads when (i) electrical energy generation from the RES is greater than the demand from the one or more consumer loads, and (ii) the state of charge of the ESS is at the maximum charge limit. In some cases, when the state of charge of the ESS is not at the maximum charge limit, and the electrical energy generation from the RES is greater than a sum of (i) a demand from the one or more consumer loads and (ii) the maximum charge limit of the ESS in its current state of charge, the EMS is configured to reduce the electrical energy generation from the RES to match the sum. In some cases, when the state of charge of the ESS is not at the maximum charge limit, and the electrical energy generation from the RES is greater than a demand from the one or more consumer loads, but less than a sum of (i) the demand of the one or more consumer loads, and (ii) the maximum charge limit of the ESS in its current state of charge, the EMS is configured to deliver electrical energy from the RES to meet the demand from the one or more consumer loads and deliver any remaining electrical energy to the ESS. In some cases, when the electrical energy generation from the RES is less than a demand of the one or more consumer loads, and the state of charge of the ESS is above the minimum charge limit, the EMS is configured to deliver electrical energy from the RES and the ESS sufficient to meet the demand of the one or more consumer loads. In some cases, when the electrical energy generation from the RES is less than a demand of the one or more consumer loads, and the state of charge of the ESS is at or below the minimum charge limit, the EMS is configured to deliver electrical energy from the RES to the one or more consumer loads.

In some embodiments, the one or more active meters communicate information about the energy consumption of the one or more consumer loads to the EFAS in real time. In some embodiments, the one or more active meters are configured to disconnect energy flow to a consumer load if the consumer load reaches the maximum energy limit. In some cases, the consumer load is associated with a plurality of devices and the one or more active meters are configured to disconnect energy flow to one or more of the plurality of devices if the consumer load reaches the maximum energy limit. In some cases, the EFAS is configured to monitor the state of charge of the ESS such that the maximum energy limit for each of the one or more consumer loads does not lower the state of charge of the ESS below the minimum charge limit.

In some embodiments, the maximum energy limit is based at least in part on equal amounts of electrical energy being allocated to each of the one or more consumer loads. In some embodiments, the maximum energy limit is based at least in part on a priority system. In some cases, the maximum energy limit is based at least in part on a forecast of energy consumption by each of the one or more consumer loads. In some instances, the EFAS is programmed to communicate to a user of the one or more consumer loads an energy reduction plan to maintain the one or more consumer loads within the maximum energy limit when a user of the one or more consumer loads is expected to exceed the maximum energy limit. In some instances, the EFAS is configured to communicate to a user of the one or more consumer loads when the user is expected to stay below the maximum energy limit and accumulate excess energy. For example, the EFAS a user to (i) offer the excess energy for sale to the renewable microgrid, or (ii) offer the excess energy for sale to other users of the one or more consumer loads. In some embodiments, the renewable microgrid comprises an islanded renewable microgrid.

In another related yet separate aspect, a method is provided for managing electrical energy generated by a renewable microgrid comprising a renewable energy system ("RES"), an energy storage system ("ESS"), an energy management system ("ESS"), one or more active meters, and an energy forecasting and allocation system ("EFAS"). The method comprises: monitoring, via the one or more active meters, energy consumption of one or more consumer loads; forecasting, via the EFAS, an amount of electrical energy available from the RES and ESS for a plurality of time periods; allocating, via the EFAS, for each of the plurality of time periods, a maximum energy limit available to each of the one or more consumer loads; and directing, via the EMS, electrical energy flow from the RES to the one or more consumer loads, from the RES to the ESS, or from the ESS to the one or more consumer loads.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings (also "Figure" and "FIG." herein), of which:

DETAILED DESCRIPTION

While various embodiments of the disclosure have been shown and described herein, it will be obvious to those skilled in the art that such embodiments are provided by way of example. Numerous variations, changes, and substitutions may occur to those skilled in the art without departing from the disclosure. It should be understood that various alternatives to the embodiments of the disclosure described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values.

For example, less than or equal to 3, 2, or 1 is equivalent to less than or equal to 3, less than or equal to 2, or less than or equal to 1.

Figure 1:
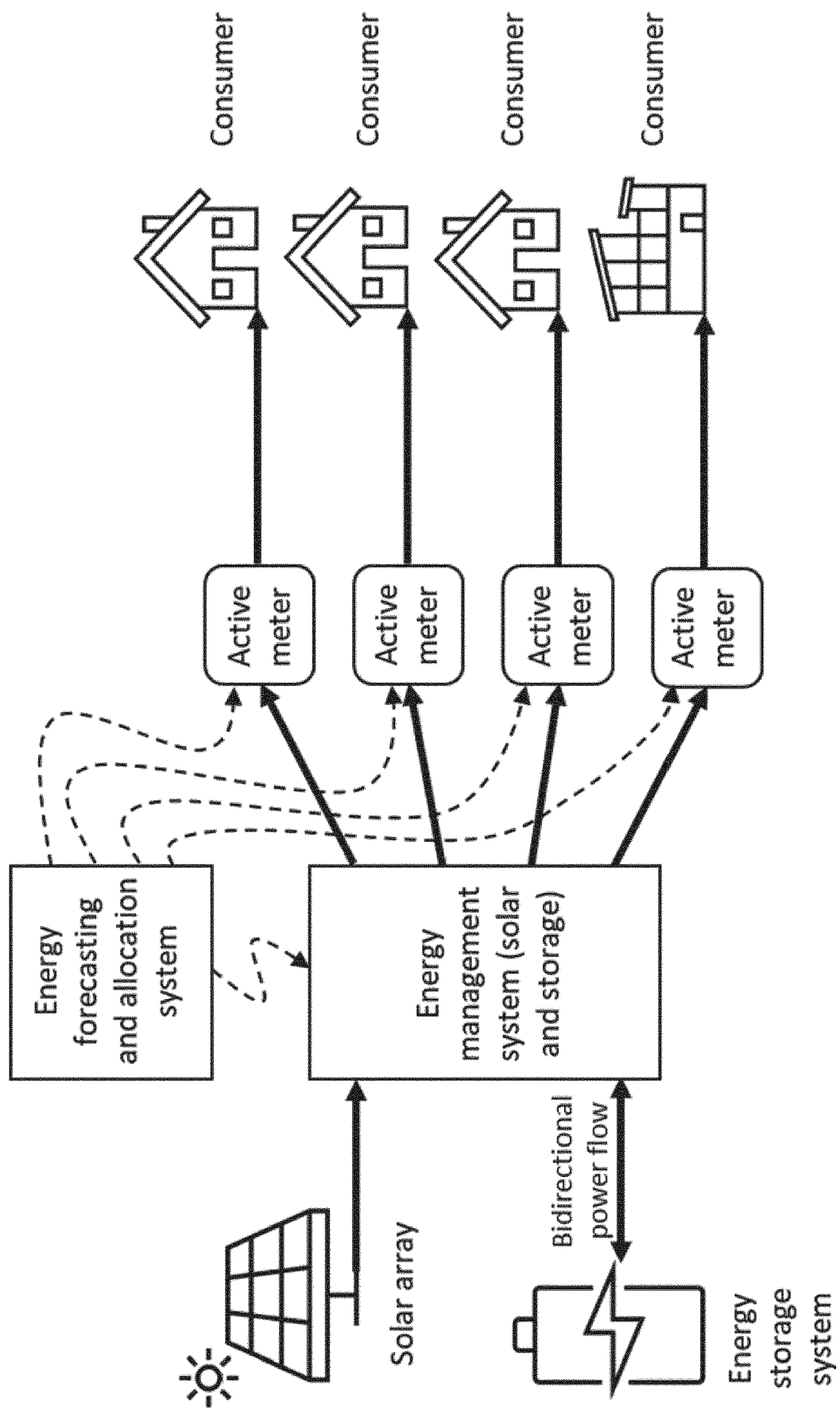
FIG. 1 schematically illustrates a renewable microgrid system for managing electrical energy generated by a renewable microgrid, in accordance with some embodiments.

FIG. 1 schematically illustrates a renewable microgrid system for managing electrical energy generated by a renewable microgrid. The managing may include metering and allocating energy generated by a renewable microgrid. In some embodiments, the renewable microgrid may be islanded, meaning that the renewable microgrid does not have access to additional energy generation (e.g., from fossil fuel sources) to provide energy to consumers of the renewable microgrid. In other embodiments, the renewable microgrid need not be islanded, meaning the renewable microgrid has access to additional energy generation (e.g., from fossil fuel sources) to supplement the energy provided to consumers of the renewable microgrid.

The system can comprise a renewable energy system configured to generate electrical energy from a renewable energy source (RES). As illustrated in FIG. 1, the RES may comprise a solar PV array comprising solar cells. In additional embodiments, the RES may comprise a wind farm comprising wind turbines. The renewable energy system may comprise a plurality of RES inverters. The RES inverters may convert the direct current (DC) electricity generated by the solar cells to alternating current (AC) electricity that can be used by the electrical grid. The RES inverters may have a first aggregate energy capacity.

The system can also comprise an energy storage system ("ESS") configured to store energy from the RES. As illustrated in FIG. 1, the ESS may be a battery energy storage system ("BESS"). The ESS may comprise a maximum charge limit, a minimum charge limit, and a state of charge. The ESS may comprise a plurality of ESS inverters. The ESS inverters may have a second aggregate energy capacity.

The first aggregate energy capacity of the plurality of RES inverters and the second aggregate energy capacity of the plurality of ESS inverters may be the same or they may be different. In some cases, the first aggregate energy capacity of the plurality of RES inverters (i.e., maximum potential energy output of the RES) may be larger than the maximum expected total electrical load on the system. This beneficially allows the renewable energy source to be capable to deliver enough energy to the electrical loads during adverse weather conditions. This also beneficially allows the renewable energy source to be capable to charge the ESS (e.g., a large ESS) while providing enough energy output to the electrical loads. When a solar RES is not able to deliver energy at night, the ESS may be controlled to deliver energy to the electrical loads to complement the RES. Alternatively or additionally, the ESS may deliver energy directly to the electrical load concurrently with the RES. For instance, during periods of moderately adverse weather when the production of the RES is below the maximum potential output of the RES or below the demand of the electrical load, the ESS may deliver the energy to the electrical loads.

The first aggregate energy capacity of the plurality of RES inverters and the second aggregate energy capacity of the plurality of ESS inverters may be configured to combine to be 50% or greater than a consumer energy demand of the renewable microgrid. The first aggregate energy capacity of the plurality of RES inverters and the second aggregate energy capacity of the plurality of ESS inverters may be configured to combine to be 100% or greater than the consumer energy demand of the renewable microgrid. The first aggregate energy capacity of the plurality of RES inverters and the second aggregate energy capacity of the plurality of ESS inverters may be configured to combine to be 150% or greater than the consumer energy demand of the renewable microgrid. The first aggregate energy capacity of the plurality of RES inverters and the second aggregate energy capacity of the plurality of ESS inverters may be configured to combine to be 200% or greater than the consumer energy demand of the renewable microgrid. The first aggregate energy capacity of the plurality of RES inverters and the second aggregate energy capacity of the plurality of ESS inverters may be configured to combine to be at least 5%, 10%, 15%, 20%, 25%, 30%, 35%, 40%, 45%, 50%, 55%, 60%, 65%, 70%, 75%, 80%, 85%, 90%, 95%, 100%, 200%, 300%, 400%, 500%, or greater than the consumer energy demand of the renewable microgrid.

The RES and ESS may further comprise equipment in addition to the plurality of inverters that help deliver electrical energy from the RES and ESS to the microgrid. For example, the RES and ESS may comprise one or more transformers, one or more cables, and one or more switchgears configured to help deliver electrical energy from the RES to the microgrid. In some cases, the one or more transformers, one or more cables, and one or more switchgears of the RES may be oversized such that the RES is able to deliver energy to the microgrid greater than the maximum consumer demand of the renewable microgrid. Such oversized RES beneficially allows for enough energy to be delivered during adverse weather conditions. For example, one or more internal transformers, one or more cables, and one or more switchgears of the RES may be oversized to increase the potential capacity of the RES while the output transformers, cabling and switchgears that take energy onto the microgrid may be sized to deliver energy to the microgrid at a level equal to the total consumer demand of the renewable microgrid. The one or more internal transformers, one or more cables, and one or more switchgears of the RES may be sized such that the RES has a capacity to deliver energy to the microgrid at a level at least 5%, 10%, 15%, 20%, 25%, 30%, 35%, 40%, 45%, 50%, 55%, 60%, 65%, 70%, 75%, 80%, 85%, 90%, 95% 100%, 200%, 300%, 400%, 500%, or greater than the maximum consumer demand of the renewable microgrid. The one or more output transformers, one or more cables, and one or more switchgears of the RES may be sized to deliver energy to the microgrid at a level equal to about 5%, 10%, 15%, 20%, 25%, 30%, 35%, 40%, 45%, 50%, 55%, 60%, 65%, 70%, 75%, 80%, 85%, 90%, 95% or 100% of the total consumer demand of the renewable microgrid. In some embodiments, the ESS may not be oversized. Alternatively, the ESS may be oversized. For example, one or more internal transformers, one or more cables, and one or more switchgears of the ESS may be oversized such that the ESS has a potential capacity to deliver energy to the microgrid at a level equal to or greater than the total consumer demand of the renewable microgrid. The one or more output transformers, one or more cables, and one or more switchgears of the ESS may be sized to deliver energy to the microgrid at a level equal to the total consumer demand of the renewable microgrid. The one or more internal transformers, one or more cables, and one or more switchgears associated with the ESS may be sized such that the ESS is capable to deliver energy to the microgrid at a level at least about 5%, 10%, 15%, 20%, 25%, 30%, 35%, 40%, 45%, 50%, 55%, 60%, 65%, 70%, 75%, 80%, 85%, 90%, 95% or 100% greater than the total consumer demand of the renewable microgrid. The one or more output transformers, one or more cables, and one or more switchgears of the ESS may be sized to deliver energy to the microgrid at a level equal to about 5%, 10%, 15%, 20%, 25%, 30%, 35%, 40%, 45%, 50%, 55%, 60%, 65%, 70%, 75%, 80%, 85%, 90%, 95% or 100% of the total consumer demand of the renewable microgrid. The sizing of the RES and ESS can be configured to ensure the renewable microgrid can provide energy expected to be sufficient to the one or more consumers at all times and in a steady fashion. For example, the ESS can be sized to deliver energy to one or more consumer loads for as long as 24 or more hours, up to the time it would take to discharge the energy in the ESS from a fully-charged state at the maximum charge limit. The ESS can deliver this energy for as long as 1, 2, 3, 4, 5, 6, 7, 8, 9, 10, 11, 12, 13, 14, 15, 16, 17, 18, 19, 20 21, 22, or 23 or more hours, up to the time it would take to discharge the energy in the ESS from a fully-charged state at the maximum discharge limit.

However, relying on oversizing the energy source alone may not achieve satisfactory result. First, such approach may not guarantee that the loads can be served. For example, if the weather is worse than planned, or the underproduction by the renewable source is more severe than planned, the renewable source may fail to produce enough energy to serve the loads. In practice, the microgrid designer may need to determine how often it is acceptable for the system to fail to serve the load, in order to determine the required oversizing of the renewable source. Second, as the requirement for the load-service percentage increases, the required degree of oversizing may increase thus inducing increased cost of the microgrid. The system described herein may reduce the degree of oversizing the renewable source by combining it with the active meters and an energy forecasting and allocation system ("EFAS") as described later herein.

The system can also comprise an energy management system ("EMS") configured to direct electrical energy from the RES to one or more consumer loads, from the RES to the ESS, or from the ESS to the one or more consumer loads. A consumer load may be defined by the electrical energy demand from one or more consumers connected to the renewable microgrid. Electrical energy flow from the RES may be dynamic. For example, if the RES is a solar array, the electrical energy flow from the RES may vary as the time of day, weather, amount of sunlight, temperature, and other factors change. The electrical energy flow from the ESS may be controlled to complement the output of the RES, and may change as the state of charge of the ESS changes. For example, when the amount of electrical energy from the RES reduces, the ESS may be controlled to increase the output energy to provide enough total energy to the microgrid. The amount of electrical energy directed by the EMS from the RES and the ESS to the one or more consumer loads may vary. For example, the amount of electrical energy delivered to the one or more consumer loads may be 100% from the RES and 0% from the ESS, 90% from the RES and 10% from the ESS, 80% from the RES and 20% from the ESS, 70% from the RES and 30% from the ESS, 60% from the RES and 40% from the ESS, 50% from the RES and 50% from the ESS, 40% from the RES and 60% from the ESS, 30% from the RES and 70% from the ESS, 20% from the RES and 80% from the ESS, 10% from the RES and 90% from the ESS, or 0% from the RES and 100% from the ESS. The ratio of electrical energy delivered by the RES and ESS to the one or more consumer loads can be modulated in real time to achieve desired operating conditions and performance. The amount of electrical energy delivered by the RES to the one or more consumer loads may increase when renewable energy production is at a peak. For example, when the RES comprises a solar PV array, the RES may deliver 100% of the consumer energy demand during the middle of a day with ample sunlight. The amount of electrical energy delivered by the ESS to the one or more consumer loads may increase to compensate for the fluctuations in energy delivery from the RES. For example, the ESS can deliver 100% of the consumer energy demand during the night, when a RES comprising a solar PV array is unable to generate electrical energy. This change can be made in real time to ensure energy delivery to the one or more consumer loads remains constant, preventing power spikes and power outages. The EMS may ensure that the state of charge of the ESS remains above a minimum threshold.

Figure 4A:
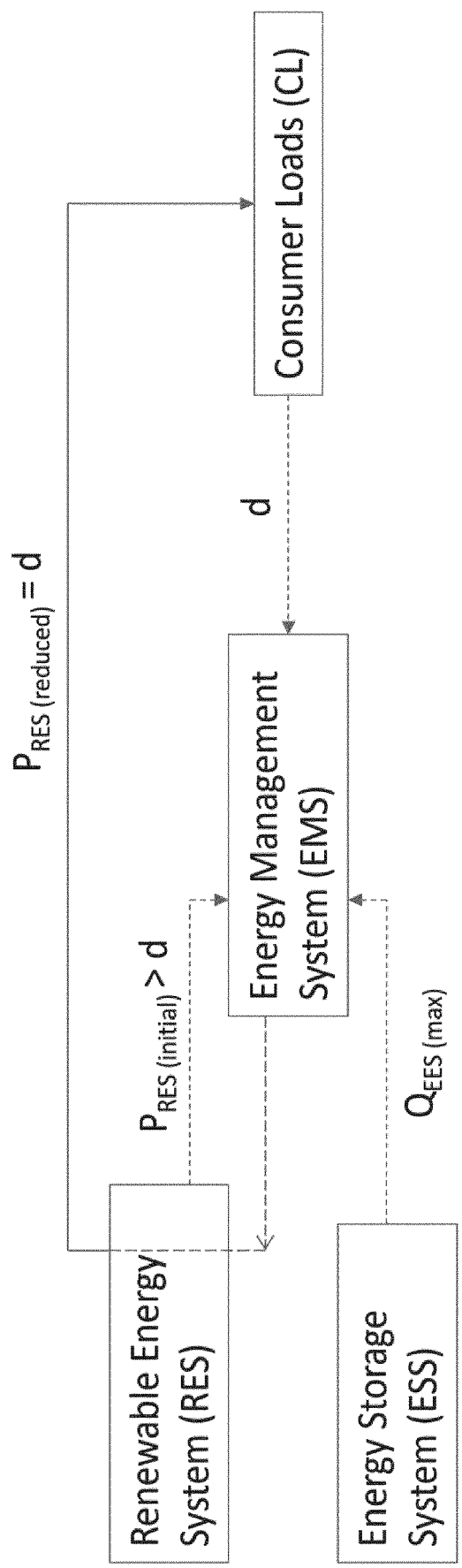
FIGS. 4A through 4F are flow charts illustrating the flow of energy from the renewable energy system and the energy storage system ("ESS") to one or more consumer loads, in accordance with some embodiments.
Figure 4B:
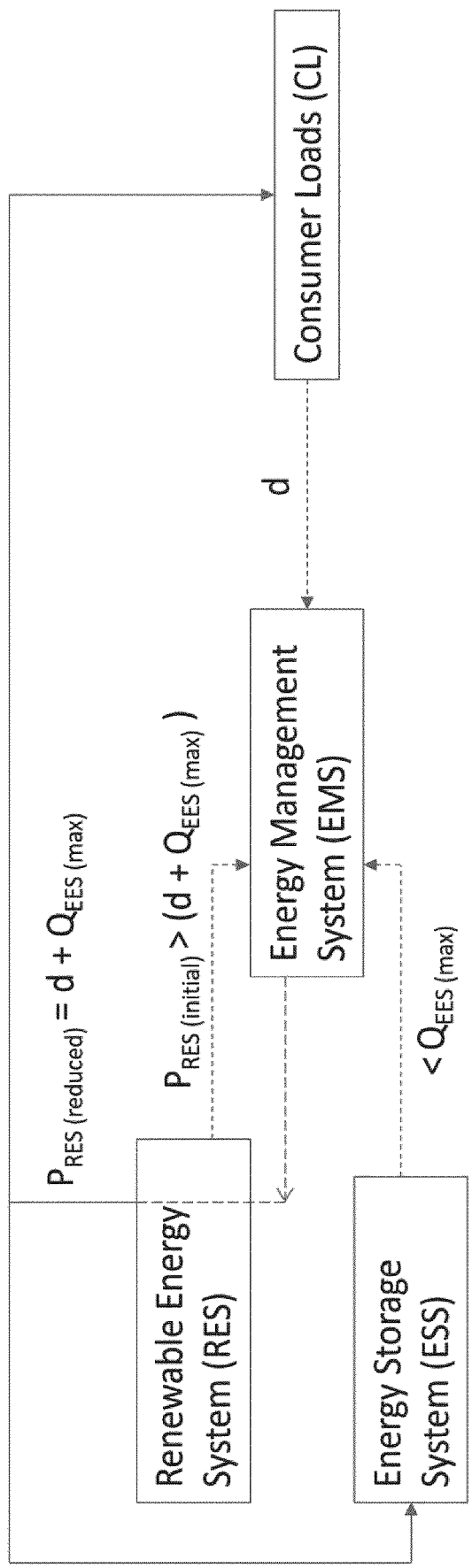
Figure 4C:
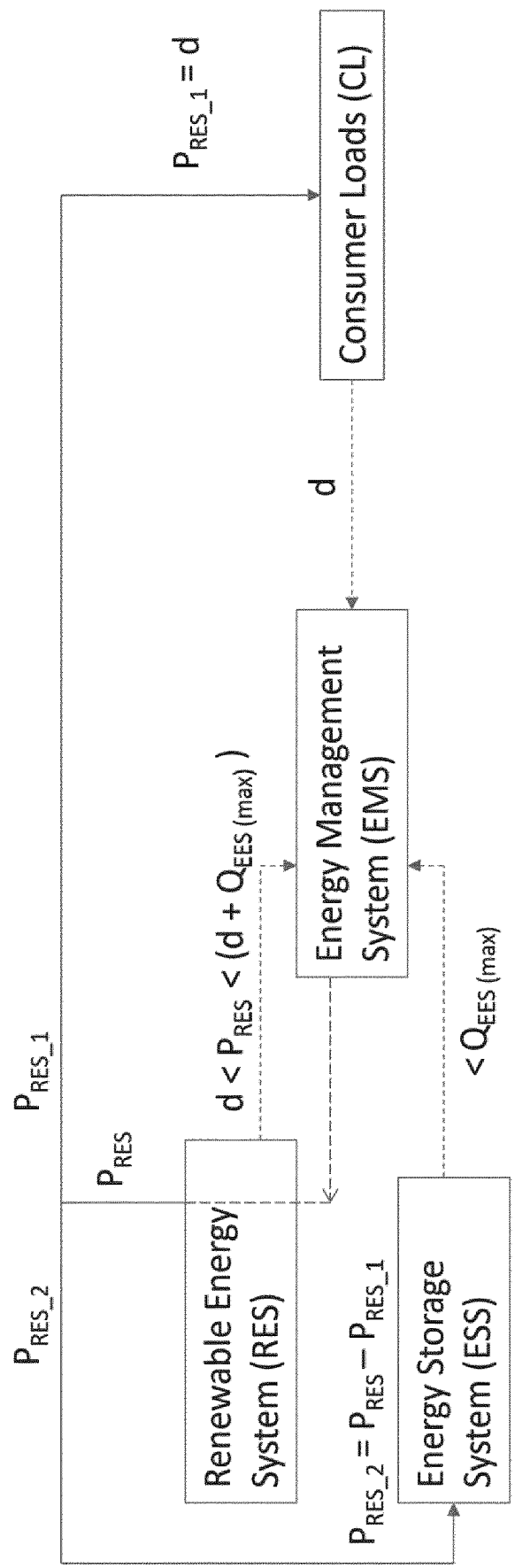
Figure 4D:
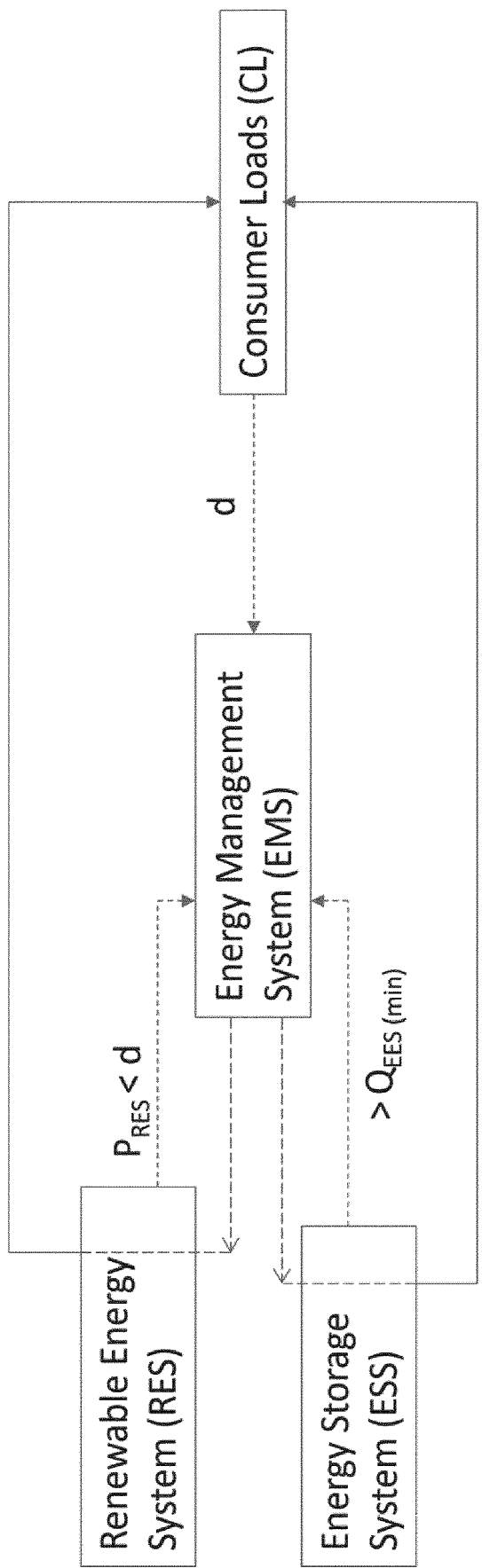
Figure 4E:
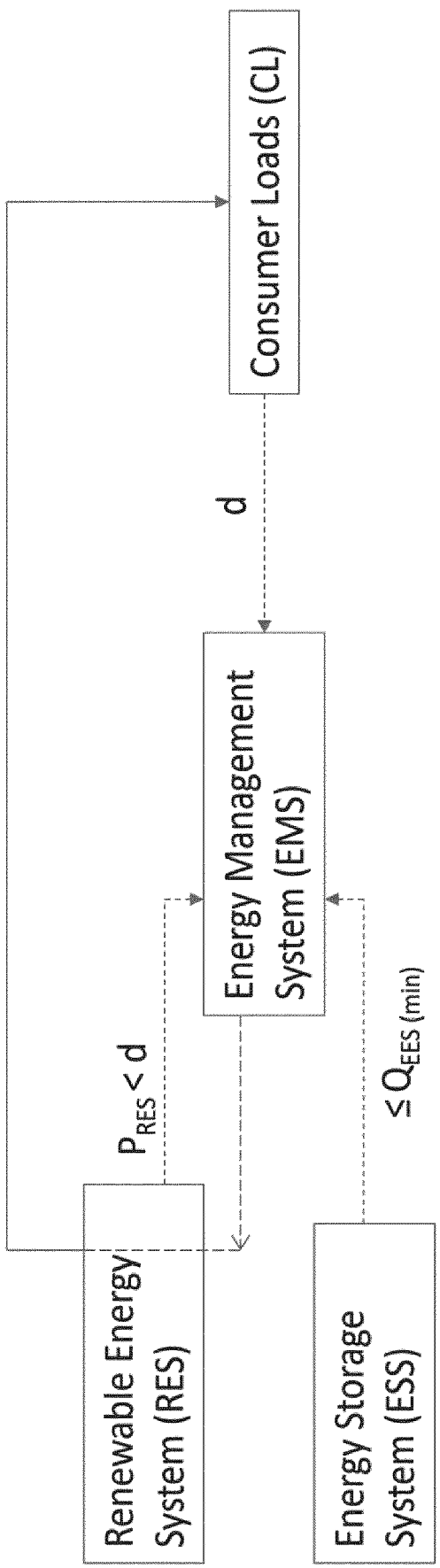
Figure 4F:
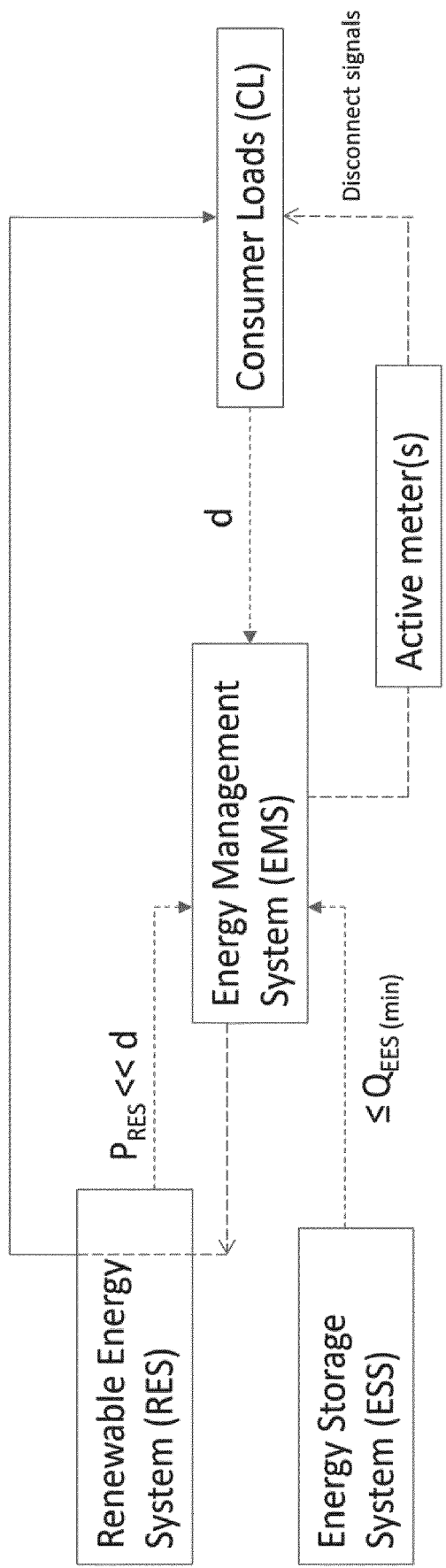

The EMS may direct energy either into the ESS, to charge the ESS, or out of the ESS, discharging the ESS to one or more consumer loads. In some embodiments, as illustrated in FIG. 4A, where (i) electrical energy generation from the RES is greater than the demand from one or more consumer loads, and (ii) the state of charge of the ESS is at the maximum charge limit, the EMS can reduce the electrical energy generation of the RES to match the demand of the one or more consumer loads. In some embodiments, as illustrated in FIG. 4B, where the ESS is not fully charged, and the energy that could be generated by the RES is greater than the sum of (i) a demand from one or more consumer loads, and (ii) the maximum charging limit of the ESS in its current state of charge, the EMS can reduce the electrical energy generation of the RES to match the sum of (i) and (ii). In some embodiments, as illustrated in FIG. 4C, where the ESS is not fully charged, and the energy that could be generated by the RES is greater than the demand of the one or more consumer loads, but less than the sum of (i) the demand of the one or more consumer loads, and (ii) the maximum charging limit of the ESS in its current state of charge, the EMS can deliver electrical energy from the RES to meet the demand from the one or more consumer loads and deliver the remaining electrical energy to the ESS. In some embodiments, as illustrated in FIG. 4D, where the electrical energy that could be generated by the RES is less than the demand of one or more consumer loads, and the state of charge of the ESS is above the minimum charge limit, the EMS can deliver electrical energy from the RES and ESS that is sufficient to meet the demand of the one or more consumer loads. In some embodiments, as illustrated in FIG. 4E, where the electrical energy that could be generated by the RES is less than the demand of one or more consumer loads, and the state of charge of the ESS is at or below the minimum charge limit, the EMS can deliver the available energy from the RES to the one or more consumer loads. As illustrated in FIG. 4F, when the electrical energy available from the RES and ESS is not sufficient to meet the demand of the one or more consumer loads, the system can disconnect a part, or an entire load, of a consumer load, as will be described herein.

The system can comprise one or more active meters communicatively coupled to one or more consumer loads. As illustrated in FIG. 1, the active meters can be communicatively coupled to the EMS, and an energy forecasting and allocation system ("EFAS"). The one or more active meters can be configured to monitor the energy consumption of the one or more consumer loads, and communicate the energy consumption to the EMS and EFAS. The one or more active meters can communicate the energy consumption information to the EMS and EFAS in real time, or near real time. As illustrated in FIG. 1, each of the one or more active meters can individually be connected to one consumer load. In other embodiments, each of the one or more active meters can be connected to multiple consumer loads. The one or more active meters can limit, or disconnect energy flow to a consumer load. The one or more active meters can further limit, or disconnect energy flow to one or more devices of a consumer load comprising a plurality of devices. As an example, the active meters can shut down the air conditioning system connected to a consumer's home, but not other electrical loads connected to the consumer's home. As an additional example, the active meters can shut down some, but not all, of the elevators in a consumer's office building. The one or more active meters can limit, or disconnect energy flow to a consumer load when, for example, a consumer load has reached a maximum energy limit, as will be described herein.

The system can comprise an EFAS communicatively coupled to the EMS and the one or more active meters. The EFAS can be configured to forecast an amount of electrical energy available from the RES and the ESS for a plurality of time periods. The EFAS can further be configured to allocate, for each of the plurality of time periods, a maximum energy limit available to each of the one or more consumer loads. The plurality of time periods together can comprise a forecast period. Each of the plurality of time periods can be about 1, 2, 3, 4, 5, 6, 7, 8, 9, 10, 15, 20, 25, 30, 35, 40, 45, 50, 55, or 60 minutes or more. In addition, the time periods can be about 1, 2, 3, 4, 5, 6, 7, 8, 9, 10, 11, 12, 13, 14, 15, 16, 17, 18, 19, 20, 21, 22, 23, or 24 hours or more. In addition, the time periods can be about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days or more. Each of the time periods in a forecast period may be equal in length, or they may have differing durations. As an example, for a renewable microgrid comprising a solar PV RES, a forecast period could end at a next time point at which total consumer energy demand from one or more consumer loads is less than the instantaneous electrical energy generation from the solar PV RES, after having been more than the instantaneous electrical energy generation from the solar PV RES for at least a minimum length of time (e.g., three hours, six hours, nine hours). This point in time could mark a point where the ESS would reach a state of charge at, or near, its minimum charge limit.

The EFAS can be configured to allocate, for each of the plurality of time periods, a maximum energy limit available to each of the one or more consumer loads. The maximum energy limit may be a maximum energy limit that can be drawn by the one or more consumer loads over an entire forecast period. The EFAS may ensure, using the forecast of the amount of electrical energy available from the RES and the ESS for a forecast period, that the maximum energy drawn by the one or more consumer loads does not lower the state of charge of the ESS below its minimum charge limit. The energy allocations can be determined such that an equal amount of energy is allocated to each of the one or more consumer loads. Alternatively, the energy allocations can be determined based on a priority system. The priority system may comprise a list of higher priority consumer loads and lower priority consumer loads. The priority system may be based on pricing tiers, determinations of need, household/building size, type of home/building, geographic location of the home/building, demographic information, or other similar systems. For example, some consumers may pay a higher price for energy than others, and the system may allocate a higher maximum energy limit to higher paying customers than lower paying customers. The system may also allocate the maximum energy limit based on the size of a consumer home or building. For example, consumer homes on the microgrid may vary in size (e.g., square footage). The system may allocate a higher maximum energy limit to consumers with higher square footage homes than those with lower square footage homes. The system may also allocate the maximum energy limit based on the type of consumer home or building. For example, energy consumption needs may vary if the consumer building is a home, a condominium, an apartment, an office building, or critical infrastructure such as a healthcare facility, etc. The system can allocate a higher maximum energy limit to buildings requiring higher energy consumption and a lower maximum energy limit to building requiring lower energy consumption. The system may also allocate the maximum energy limit based on the geographic location of the consumer loads. Some consumer loads may require higher energy consumption based on their geographic location. For example, during summer time, some consumer loads may be located in geographic areas that have higher temperatures than other geographic areas, and may thus require higher energy consumption (e.g., higher use of air conditioning). The system can allocate a higher maximum energy limit to geographic areas requiring higher energy consumption and allocate a lower maximum energy limit to geographic areas requiring a lower energy consumption.

The energy allocations may also be based on a forecast of energy consumptions of each of the one or more consumer loads. For example, the forecasts may be based on historical consumption patterns or physical models. The forecasts may also be based on data comprising information about days of the week, time of the year, and weather conditions including temperature, cloud coverage, rain, snow, etc. The forecast of energy consumption can ensure that the EFAS allocates energy to higher priority consumer loads first, and then allocates energy for the remaining lower-priority consumer loads.

The energy allocations may also be based on a forecast of the weather which influences the capability of the renewable energy sources. For example, the system may store predetermined relationship about how weather influences on renewable generation and the forecast of the weather may be translated into the energy capacity or the production of the RES.

The EFAS can also be configured to communicate with the users of the one or more consumer loads. The communications may be sent via mobile phone app, text message, automatic voice response system, email, web site, or other similar technologies as described herein. The communications may come automatically, or may come at the request of a user of the one or more consumer loads, or may be triggered by an operator of the EFAS. The EFAS can be configured to use the forecast of energy consumption of each of the one or more consumer loads described above to determine whether the consumer loads attached to the active meters are expected to stay within the maximum energy limit allocated to them. The EFAS, for example, can be programmed to communicate to a user of the one or more consumer loads when the consumer load is expected to exceed the maximum energy limit. For example, the EFAS can communicate to a user when the user has used 70% or more of their maximum energy limit over a forecast period. The EFAS can communicate to a user when the user has used 80% or more of their maximum energy limit over a forecast period. The EFAS can communicate to a user when the user has used 90% or more of their maximum energy limit over a forecast period. The EFAS can communicate to a user when the user has used 10%, 20%, 30%, 40%, 50%, 60%, 70%, 80%, 90%, 95%, 96%, 97%, 98%, or 99% or more of their maximum energy limit over a forecast period. The EFAS also, for example, can be programmed to communicate to a user of the one or more consumer loads an energy reduction plan to maintain the one or more consumer loads within the maximum energy limit when the user of the one or more consumer loads is expected to exceed the maximum energy limit. The energy reduction plan can comprise an energy limit or power limit, that, if complied with, would ensure the user of the consumer load would stay within the maximum energy limit. For example, the communication can say "you are currently consuming 25 kW and we need to ask you to reduce your average consumption to 15 kW for the rest of today." The energy reduction plan may also comprise a comparison to expected energy consumption patterns. For example, the communication can say "you would usually consume 50 kWh during the next 12 hours; we need to ask you to reduce this to 35 kWh today." The energy reduction plan can include specific recommendations of how the consumer can stay within the maximum energy limit. In the example above asking the consumer to drop the average consumption to 15 kW for the rest of the day, the energy reduction plan may include a recommendation of how to succeed in dropping to 15 kW. For example, the energy reduction plan may include a recommendation to set a thermostat at a certain temperature to limit the amount of energy used by a heating or cooling system.

When a consumer load is forecast to exceed its maximum energy limit, the EFAS can communicate with the active meter connected to the consumer load and instruct the active meter to take action to keep the consumer load with the maximum energy limit. For example, the active meter can limit, or disconnect energy flow to the one or more consumer loads. As an additional example, the active meter can limit, or disconnect energy flow to one or more devices of a consumer load comprising a plurality of devices. The active meter can limit, or disconnect energy flow to lower priority devices. The active meter can also operate one or more devices in a reduced-service mode. The EFAS may communicate with a user of the consumer load before taking action. Alternatively, the EFAS may take action without communicating with a user of the consumer load. For example, the user of the consumer load may have a pre-arranged agreement with the renewable microgrid setting forth actions to take to keep the consumer load within the maximum energy limit. This may allow the EFAS to take action early enough to minimize impact to the user of the consumer load.

In some embodiments, a consumer load's energy allocation may be determined by an advance agreement between a user of the consumer load and the renewable microgrid. Based on the forecast of energy consumption of the consumer load, if the EFAS determines that the energy allocation of the consumer load can be increased without an adverse impact on the energy availability to other consumer loads on the renewable microgrid, the EFAS can communicate with the user of the consumer load offering to increase the energy allocation to the consumer load. The increased energy allocation can come with an additional payment from the user of the consumer load.

In some embodiments, based on the forecast of energy consumption of a consumer load, the EFAS may determine that a consumer load is forecast to stay below the maximum energy limit. The EFAS can communicate to the user of the consumer load that the user is expected to stay below the maximum energy limit and accumulate excess energy. Alternatively, a user of the consumer load may determine on their own that the maximum energy limit will exceed their energy requirements. When a consumer load is expected to stay below its maximum energy limit, the EFAS may allow the user to (i) offer the excess energy for sale back to the renewable microgrid, or (ii) offer the excess energy for sale to other users of the other consumer loads of the renewable microgrid. If a user of a consumer load sells energy to another user of another consumer load, then the EFAS can increase the maximum energy limit to the user buying the energy, and decrease the maximum energy limit to the user selling the energy.

Figure 5A:
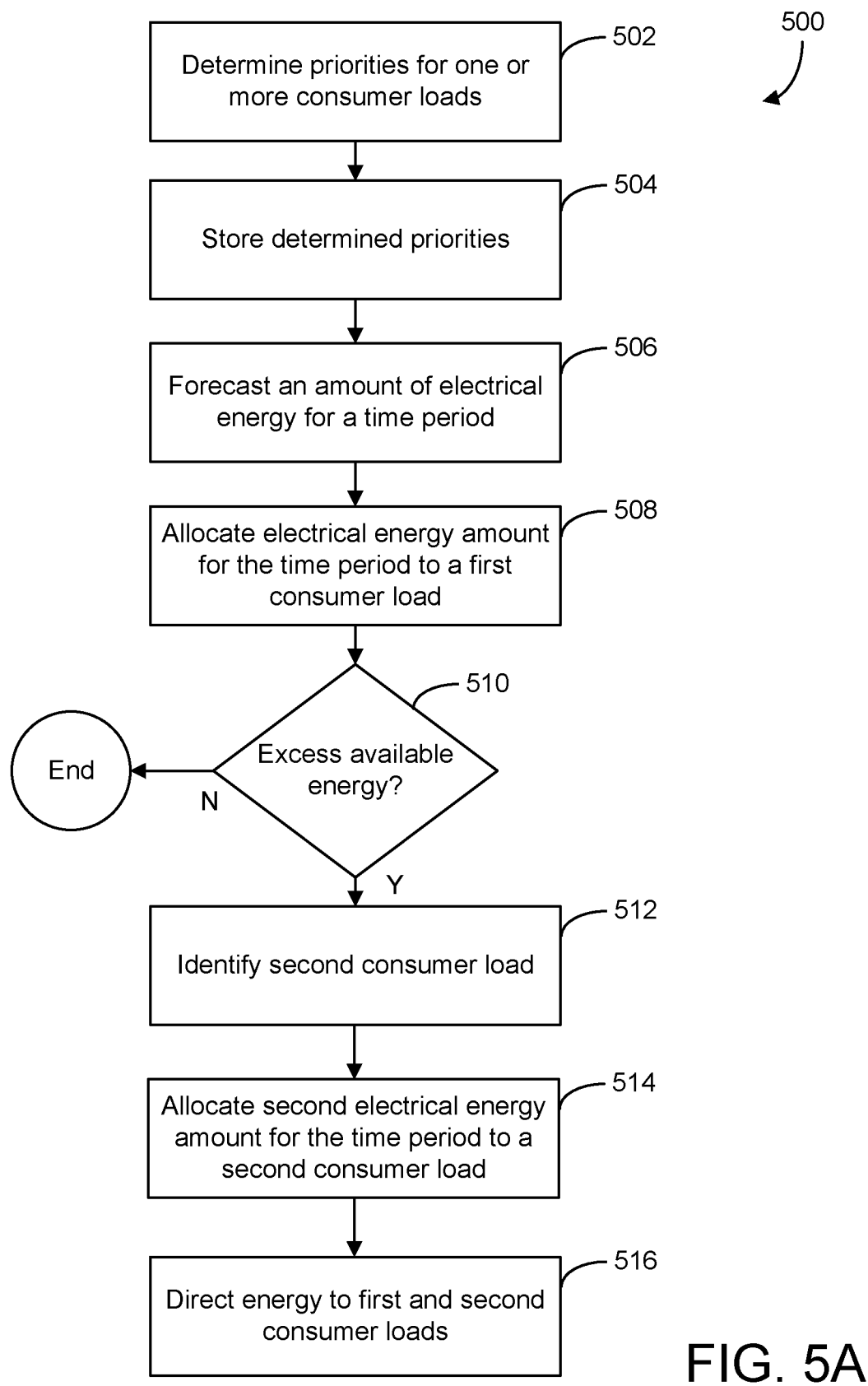
FIG. 5A illustrates a method for microgrid energy allocation, according to some embodiments.

FIG. 5A illustrates a method for microgrid energy allocation, according to some embodiments. Method 500 can be performed by a data processing system (e.g., a controller, a computer of computer system 201, shown and described with reference to FIG. 2, etc.). The data processing system may be a computer system that controls energy distribution of a microgrid and/or the microgrid itself. Method 500 may include more or fewer operations and the operations may be performed in any order. Performance of method 500 may enable the data processing system to allocate energy from an RES and/or a ESS of the microgrid to different consumer loads according to a range of criteria and ensure the consumer loads that need energy the most continue to receive energy, even in situations in which there is not enough energy to allocate energy to all consumer loads that are managed by the data processing system. Performance of method 500 may be particularly useful when controlling an islanded microgrid that has a limited and/or fluctuating energy supply based on how much energy the microgrid can generate from renewable energy sources.

At operation 502, the data processing system determines priorities for one or more consumer loads. The data processing system may determine the priorities for the one or more consumer loads based on prioritization criteria that the data processing system has stored in memory. The prioritization criteria may include one or more rules that indicate how to prioritize different consumer loads based on different types of data. In one example, the prioritization criteria may include a rule that indicates for the data processing system to prioritize consumer loads based on the historical energy utilization of the different loads (e.g., the data processing system may determine that consumer loads that historically utilize more energy have higher priorities consumer loads than consumer loads that historically utilize less energy). In this example, the data processing system may maintain a list of historical energy utilization (which the data processing system may receive from meters at the respective loads) for each consumer load in memory and compare the historical energy utilization for each consumer load with each other. The data processing system may determine the priorities for the consumer loads to have an ascending or descending order based on the historical energy utilization between the consumer loads. In another example, the prioritization criteria may include a rule that indicates for the data processing system to assign priorities based on a value (e.g., a paid energy price) of the respective consumer loads. The data processing system may store the values and associations between the values and identifications of the different consumer loads and determine the priorities for the consumer loads to have an ascending or descending order by comparing the values for the consumer loads and determining the priorities accordingly.

In another example, the data processing system may determine the priorities for the consumer loads based on the types of the consumer loads. For example, the data processing system may store a type (e.g., a consumer load type) for each consumer load to which the data processing system directs energy in memory. Examples of different types include, but are not limited to, medical facilities that contain temperature-sensitive medications or supplies (e.g., refrigerators containing vaccines or blood), electrical loads at designated critical infrastructure including medical facilities, public security facilities, public cooling/warming facilities, etc.

The data processing system may store level designations for each type of consumer load that indicate how the data processing system should prioritize the different types of consumer loads. For example, the temperature-sensitive medications or supplies may be the most important and therefore be at the highest level. The designated critical infrastructure including medical facilities, public security facilities, and/or public cooling/warming facilities types may be less important and therefore be at the next highest level. Any further types may be even less important and similarly structured into descending levels. The levels may include any type and/or number of consumer loads. The data processing system can store any number of levels. Accordingly, when determining the priorities for different consumer loads, the data processing system may identify the levels associated with the consumer loads' types and assign the priorities based on the levels (e.g., assign consumer loads with types in the highest level the highest priority, consumer loads with types in the next highest level the next highest priority, etc.). In this way, the data processing system may ensure the microgrid provides energy to consumer loads for which energy is most vital to operate even in instances in which the microgrid is not able to generate sufficient energy from renewable sources to provide energy to all the connected consumer loads.

In embodiments in which the data processing system determines priorities for consumer loads based on levels in which the data processing system grouped the types, the data processing system may determine priorities to consumer loads within the levels based on further rules. For example, when determining priorities, the data processing system may identify the consumer loads that are within the highest level. The data processing system may then determine priorities for the consumer loads within the level based on historical energy usage, value associations, consumer load sub-types, or any other type of data about the consumer loads compared to the other consumer loads within the level. The data processing system may compare such data for consumer loads within each level in an iterative process to determine priorities for the consumer loads as compared to each other within the respective levels. Thus, the data processing system may enable a further degree of customization for determining priorities for consumer loads.

The prioritization criteria may include any number of rules. For example, the prioritization criteria may include a rule in which energy users may pay a fixed fee to be assigned a higher priority rating for a period of time (regardless of how much energy they use). In another example, the data processing system may assign consumer loads higher priority ratings based on other public policy priorities. Such rules may be used alone or in combination with any other rules to allow an administrator to customize which consumer loads to prioritize.

At operation 504, the data processing system stores the determined priorities. The data processing system may store the determined priorities in memory. To do so, the data processing system may identify the location of the consumer loads for which the priorities were determined in memory and store associations between the priorities and respective consumer loads in the memory. For example, the data processing system may store identifications of the consumer loads in a relational database. The data processing system may store relationships between the priorities and the consumer loads in the relational database (e.g., store the priorities and their respective consumer loads in the same rows within the relational database). Accordingly, the data processing system may establish a priority order that indicates which consumer load to prioritize when allocating energy to the different consumer loads.

At operation 506, the data processing system forecasts an amount of electrical energy available from the renewable energy system and an energy storage system for a time period. The data processing system may forecast the amount of electrical energy for the time period based on a weather forecast (or any other type of forecast) that the data processing system receives from a weather forecast provider and based on the renewable energy sources (e.g., windmills or solar panels) that generate energy from the weather. In some embodiments, the data processing system generates the forecast of predicted energy production based on historical energy generation by the microgrid. In one example, the data processing system may identify the actual energy production of the microgrid at a corresponding time period to the time period of the forecast of predicted energy production (e.g., if the forecast of predicted energy production is from 1 pm to 2 pm on Tuesday, the data processing system may identify the actual energy production from 1 pm to 2 pm on the preceding Monday and determine the forecast of predicted energy production from 1 pm to 2 pm on Tuesday will be identical to the actual energy production from the 1 pm to 2 pm on Monday). In another example, the data processing system may determine the forecast of predicted energy production for the time period is an average of actual energy production in the same time frames of previous days or time periods. The data processing system may determine the forecast of energy production based on any rule or historical energy production values.

At operation 508, the data processing system allocates a first electrical energy amount to a first consumer load. The data processing system may allocate the first electrical energy amount to the first consumer load in response to determining the first consumer load has a highest stored priority of the consumer loads to which the data processing system directs energy. For example, the data processing system may retrieve the priorities of the consumer loads to which the data processing system directs energy and compare the priorities with each other. The data processing system may determine the first consumer load has the highest priority based on the comparison. The data processing system may then allocate the first electrical energy amount to the first consumer load.

In some embodiments, when allocating the first electrical energy amount to the first consumer load, the data processing system may allocate an amount of electrical energy that is equal to a first energy limit of the first consumer load. The first energy limit may indicate a maximum amount of energy that the consumer load may receive during the time period or an amount of energy that the first consumer load is required to receive during the time period according to a standard energy schedule. For example, the data processing system may store the first energy limit in memory. The data processing system may retrieve the first energy limit from the memory and compare the first energy limit to the forecast amount of energy that will be available to deliver to the first consumer load. If the forecast amount of energy that will be available is equal to or exceeds the first energy limit, the data processing system may allocate an amount of energy equal to the first energy limit to the first consumer load. Thus, the data processing system may ensure the highest prioritized consumer load is allocated enough energy to operate throughout the time period.

At operation 510, the data processing system may determine if there is forecast to be any excess available energy that can be distributed to other consumer loads. For example, the data processing system determines if the forecast available amount of energy exceeds the first energy limit or otherwise if there will be more available energy that can be distributed after allocating energy to the first consumer load. If the data processing system determines there will not be more available energy that can be distributed, the data processing system may stop performing method 500 as no more energy can be allocated.

However, if the data processing system determines more energy can be allocated to consumer loads, at operation 512, the data processing system identifies a second consumer load to allocate energy. The data processing system may identify the second consumer load responsive to determining the second consumer load has the second highest priority of the consumer loads to which the data processing system directs energy using similar methods to the above. At operation 514, the data processing system allocates a second electrical energy amount to the second consumer load. The data processing may allocate the second electrical energy amount to the second consumer load in a similar manner to how the data processing system allocates the first electrical energy amount to the first consumer load. The data processing system may repeat operations 508-514 to allocate electrical energy amounts to any number of consumer loads until either each consumer load to which the data processing system directs energy from the microgrid is allocated an amount of energy equal to the consumer loads' respective energy limits or there is not any excess available energy to allocate.

In some embodiments, the data processing system may allocate an electrical energy amount of zero to consumer loads upon determining there is not enough forecast available energy to reach an energy limit for a consumer load. For example, the second consumer load may have a second energy limit. After the data processing system allocates the first electrical energy amount to the first consumer load, the data processing system may determine there is not enough excess forecast available electrical energy to allocate to the second consumer load (e.g., determine the excess forecast available electrical energy is less than the second energy limit). After making this determination, the data processing system may allocate the remaining forecast available electrical energy to the second consumer load as the second electrical amount and allocate electrical energy amounts of zero to the remaining consumer loads to which the data processing system directs energy. Accordingly, the data processing system may ensure the higher prioritized consumer loads receive enough energy to operate, even at the expense of not providing energy to other consumer loads.

In some cases, the data processing system may determine two consumer loads have the same or identical priorities. When the data processing system does so, the data processing system may allocate equal or identical amounts of energy to the two consumer loads. For example, the data processing system may allocate the first electrical energy amount to the first energy limit and the second electrical energy amount to the second energy limit. The data processing system may then identify third and fourth consumer loads responsive to the third and fourth consumer loads having equal and the highest priorities after the second consumer load. The data processing system may identify a third energy limit of the third consumer load and a fourth energy limit of the fourth consumer load. The data processing system may identify the excess amount of energy that can be allocated and compare the excess amount to a sum of the third energy limit and the fourth energy limit. Responsive to determining the excess amount of energy is greater than the sum, the data processing system may allocate the energy to the third and fourth consumer loads to their respective limits and continue allocating energy to lower prioritized consumer loads.

However, responsive to determining the excess amount of energy is less than the sum of the third energy limit and the fourth energy limit, the data processing system may divide the excess amount of energy in half. The data processing system may allocate the divided energy to the third and fourth consumer loads. If the divided consumer load is higher than either the third energy limit or the fourth energy limit, the data processing system may allocate the divided consumer load to the respective limit, and then allocate the remaining divided consumer load to the other consumer load. Thus, the data processing system may equally allocate energy to consumer loads of equal priority.

In some embodiments, instead of allocating equal amounts of energy to consumer loads with the same priority, the data processing system may allocate amounts of energy to the consumer loads proportionally based on their energy limits as compared with each other. For example, one consumer load may have an energy limit of 90 kWh for a day (or another time period), and another consumer load may have an energy limit of 10 kWh for a day. The data processing system may identify the two energy limits and determine the ratio of the energy limits is nine to one. If the two consumer loads have equal priority and there is at least 100 kWh of energy forecast to be available from the RES or the ESS, the data processing system may allocate 90 kWh of energy to the consumer load with the energy limit of 90 kWh and 10 kWh of energy to the consumer load with the energy limit of 10 kWh. The data processing system may then allocate any excess energy to consumer loads with lower priorities. However, if there is only 90 kWh of energy that is forecast to be available and the two priority loads have equal priority, the data processing system may allocate the forecast energy to the two consumer loads according to the nine to one ratio of their energy limits (e.g., the data processing system may allocate 81 kWh of energy to the consumer load with the energy limit of 90 kWh and 9 kWh of energy to the consumer load with the energy limit of 10 kWh). In this instance, there would not be any excess energy, so the data processing system may not allocate any energy to consumer loads with lower priorities. Accordingly, the data processing system may allocate energy to the two consumer loads with equal priority so that either both consumer loads are allocated energy up to their respective energy limits or both consumer loads are allocated energy to an equal percentage of their respective energy limits.

In summary, in some embodiments, the data processing system may allocate energy to consumer loads according to the following rules: (1) if a forecast (e.g., the forecast available amount of energy for the time period) shows that there will not be sufficient energy to supply even the needs of the highest-priority load through the forecast horizon, supply (e.g., direct) all energy to the highest-priority load and no energy to any other load, (2) if the forecast shows that there will be just sufficient energy to supply the needs of the highest-priority load through the forecast horizon, supply all energy to the highest-priority load and no energy to any other load; (3) if the forecast shows that there will be more than sufficient energy to supply the needs of the highest-priority load, but not sufficient to supply both the needs of the highest-priority load and the next-highest-priority load, then supply energy to the highest-priority load throughout the forecast period, and allocate the remaining energy to the next-highest-priority load, with no energy going to any other load; (4) if the forecast shows that there will be just sufficient energy to supply the needs of both the highest-priority load and the next-highest-priority load, then supply energy to the highest-priority load and the next-highest-priority load throughout the forecast period, with no energy going to any other load; (5) in general if the forecast shows that there will be more than sufficient energy to supply the needs of the N highest-priority loads (where N is a natural number), but not sufficient to supply both the needs of the N highest-priority loads and the (N+1th)-highest-priority load, then supply energy to the N highest-priority loads throughout the forecast period, and allocate the remaining energy to the (N+1th)-highest-priority load, with no energy going to any other load; and (6) in general if the forecast shows that there will be just sufficient energy to supply the needs of the N highest-priority loads (where N is a natural number), then supply energy to the N highest-priority loads throughout the forecast period, with no energy going to any other load.

In some embodiments, in cases in which the data processing system determines there is not enough excess forecast available amount of energy to allocate to a consumer load, the data processing system may reduce the energy limits that were previously assigned to each of the consumer loads and re-allocate the energy amounts. For example, upon determining there is not enough forecast available energy to allocate to the second consumer load to reach a second limit for the second consumer load, the data processing system may reduce the energy limits of each of the consumer loads such that the data processing system may allocate energy to more or all of the consumer loads to which the data processing system directs energy.

For instance, when there is not sufficient energy to meet the normal allocations of all the consumer loads, the data processing system can reduce the energy limits of every consumer load, but with larger-percentage reductions to the lower-priorities, and smaller-percentage reductions to the higher-priorities. To give a representative example, the data processing system may store N consumer loads with N priorities, with 1 being the highest priority. The normal energy allocations or energy limits are E1, E2 . . . EN. The forecast energy available for delivery to the consumer loads may be EA. If EA>Sum(E1, E2 . . . EN) (e.g., the available energy exceeds the sum of the normal energy allocations to all the priorities), energy can be delivered to all the consumer loads. However, if EA<Sum(E1, E2 . . . EN), the energy allocated to each consumer load for the time period may be recalculated as $K_i \times E_i$ where $K_i$ is a multiplication factor applied to the ith priority (where i is a number between 1 and N) and $E_i$ is the normal energy allocation to the ith priority; $K_j < K_i$ if $j>i$—that is, the multiplication factor applied to a lower priority (where j is larger than i, j denotes a lower priority than i) would be smaller than the multiplication factor applied to a higher priority; and EA=Sum(K1×E1, K2×E2 . . . KN×EN).

In one example of this approach, the multipliers $K_i$ could be calculated as $K_i = 2^{(-Q \times i)}$ where Q is a positive constant and i is any natural number between 1 and N. If Q is zero, then $K_i = 1$ for all i, and this would be appropriate when EA>=Sum(E1, E2 . . . EN). In the case where EA<Sum (E1, E2 . . . EN), the choice of an appropriate value of Q will solve the equation EA=Sum($2^{-Q} \times$E1, $2^{(-2Q)} \times$E2 . . . $2^{(-N \times Q)} \times$EN). In a numerical example, if there are 3 priorities (N=3) and E1=E2=E3=100 kWh, and EA=150 kWh, then setting Q to 0.532378 would give allocations of 69 kWh (priority 1), 48 kWh (priority 2) and 33 kWh (priority 3), approximately.

In another approach, the data processing system may allocate energy to consumer loads using the function $K_i = 2^{\{-Q \times (2i-1)\}}$. In an example of using this function in which EA=150 kWh, Q=0.375919. The data processing system may use the function to determine the adjusted allocations of 77 kWh (priority 1), 46 kWh (priority 2) and 27 kWh (priority 3). This function would have the benefits of preserving more energy to be delivered to the consumer load with the top priority and reduces the energy that would be delivered to the lower priority consumer loads. $K_i$ can be determined using any function, equation, or approach.

At operation 514, the data processing system directs the energy to the consumer loads to which the data processing system allocated energy. The data processing system may direct the energy to the consumer loads during the time period for which the data processing system allocated the electrical energy amounts. For example, the data processing system may control the renewable energy system and/or the energy storage system of the microgrid to transmit energy from the two systems to the different consumer loads over the course of the time period according to the allocated energy amounts that the data processing system has stored in memory. In this way, the data processing system may control how much energy is delivered to each consumer load to ensure the highest priority consumer loads receive enough energy to operate, even when the energy that can be generated from renewable sources is low.

Figure 5B:
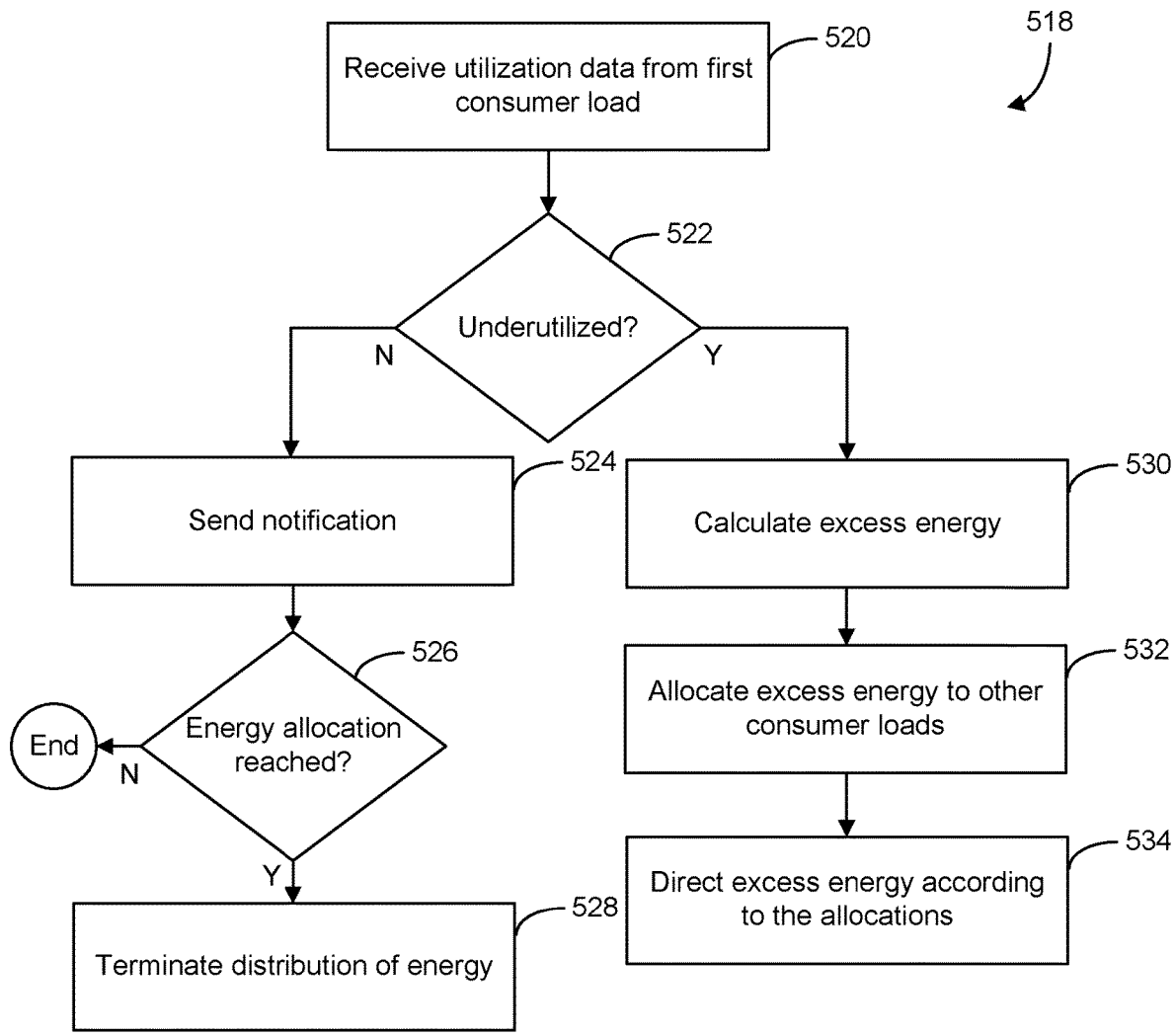
FIG. 5B illustrates another method for microgrid energy allocation, according to some embodiments.

FIG. 5B illustrates another method 518 for microgrid energy allocation, according to some embodiments. Method 518 can be performed by a data processing system (e.g., a controller, a computer of computer system 201, shown and described with reference to FIG. 2, etc.) (e.g., a data processing system of a microgrid). Method 518 may include more or fewer operations and the operations may be performed in any order. Performance of method 518 may enable the data processing system to manage energy allocation from a microgrid to different consumer loads in real-time based on data that the data processing system receives that indicates the energy usage at the different consumer loads. The data processing system may perform method 518 after performing method 500 and/or while directing energy to consumer loads in operation 516 of method 500.

At operation 520, the data processing system receives utilization data from the first consumer load. The data processing system may receive the utilization data from an energy meter (e.g., a smart meter) that is connected to the data processing system as well as the first consumer load and that monitors energy usage by the first consumer load. The utilization data may indicate how much energy the first consumer load has used throughout the time period. The data processing system may receive the energy utilization data and maintain a count of the amount of energy the first consumer load has used throughout the time period by incrementing the counter each instance the data processing system receives meter data indicating energy utilization data at the first consumer load. The data processing system may increment the counter by the amount of energy the meter detected the first consumer load used.

At operation 522, the data processing system determines if the first consumer load is underutilizing or overutilizing the energy that the data processing system directs to the first consumer load. The data processing system may determine the first consumer load is underutilizing or overutilizing the energy by comparing the current energy usage by the first consumer load to an expected energy usage by the first consumer load at a specified time within the time period according to an energy allocation schedule for the time period. For example, the data processing system may allocate 100 kWh to the first consumer load for the time period. Upon doing so, the data processing system may store indications of the amount of energy the first consumer load will consume at different times within the time period (e.g., 10 kWh one hour into the time period, 25 kWh three hours into the time period, and 100 kWh at the end of the time period). The data processing system may determine and store such expected amounts of energy based on historical energy usage (e.g., allocate an amount by a time that matches or is proportional to an amount of energy the first consumer load had previously used for that time or that the first consumer load uses on average for that time) and/or by evenly distributing the energy usage throughout the time period. The data processing system may retrieve the current energy usage for the first consumer load at a point in time and compare the retrieved current energy usage to the expected energy usage at the point in time. If the current energy usage is higher than the expected energy usage, the data processing system may determine the first consumer load is overutilizing energy that the data processing system directs to the first consumer load. However, if the data processing system determines the current energy usage is lower than the expected energy usage, the data processing system may determine the first consumer load is underutilizing energy that the data processing system directs to the first consumer load.

In some embodiments, the data processing system may determine whether the first consumer load will overutilize or underutilize energy based on an energy usage pattern by the first consumer load. The energy usage pattern may be the same as or similar to the energy allocation schedule described above. For example, the data processing system may store an energy usage pattern for the first consumer for a day (or any other time period). The energy usage pattern may be a schedule that indicates how much energy the first consumer is expected to use or have used by certain times throughout the day. The data processing system may direct energy to the first consumer load over the course of the day and monitor the energy utilization of the first consumer load throughout the day. The data processing system may compare the energy utilization to the expected amount of energy the first consumer load is expected to use at the different times during the day according to the stored energy usage pattern. In this way, the data processing system can determine if the first consumer load is overutilizing or underutilizing energy compared to the first consumer load's allocation.

Upon determining the first consumer load has utilized excess energy (e.g., determining the first consumer load has utilized energy above an expected amount for the current time based on the energy usage pattern or the energy allocation schedule), the data processing system may identify a time during the time period in which, if the first consumer load returns to energy utilization levels according to its "normal" energy usage pattern, the first consumer load would utilize an amount of energy to stay within the first consumer load's allocated amount of energy. The data processing system may do so, for example, by determining an overutilization rate of the first consumer load (which the data processing system may do by calculating the current energy overutilization compared to the energy usage pattern and dividing the current energy overutilization by the amount of time that has already passed of the time period). The data processing system may then predict the amount of energy the first consumer load is expected to utilize through future set time points of the time period by multiplying the overutilization rate by the expected energy usage for different time points of the time period to determine a predicted energy usage for each time point.

The data processing system may predict the energy usage by the first consumer load for the time point (e.g., total amount of energy the first consumer load utilized by the time point) that is the furthest from the current time and before the end of the time period. The data processing system may calculate a projected overall predicted energy usage of the time period if the consumer load returned to normal operation at the time point. The data processing system may do so by aggregating the normal energy usage of the first consumer load between the time point and the end of the time period according to the energy usage pattern with the predicted energy usage at the time point. The data processing system may compare the projected overall predicted energy usage with the allocated energy for the first consumer load. If the projected overall predicted energy usage is more than the allocated energy for the first consumer load, the data processing system may identify a time point immediately before the further time point on the energy usage pattern and repeat the process. The data processing system may repeat the process until identifying the latest time at which the first consumer load needs to revert to normal operation to remain below the allocated energy for the first consumer load.

Upon identifying a time, the data processing system may generate an alert. The alert may include the time by which the first consumer load needs to return to normal operation for the first consumer load to remain within its allocated amount of energy. The data processing system may transmit the alert to a device of a user associated with (e.g., located at) the first consumer load.

In some embodiments, the data processing system may adjust the energy usage pattern for the first consumer load for the time period based on outside factors, such as a predicted weather pattern. For instance, the data processing system may store coefficients for different types of weather (e.g., sunny, rainy, dark, cloudy, etc.). The data processing system may assign the coefficients to the expected energy usage of the first consumer load at different time points according to the predicted weather at the time points. For example, the energy usage pattern for the first consumer load may indicate that the first consumer load will use energy from 1 PM to 3 PM at a 1 kW rate. A predicted weather pattern for the time period may indicate that the weather will be rainy in the area from 1 PM to 3 PM. Accordingly, the data processing system may retrieve the coefficient from memory that is associated with rainy weather and multiply the coefficient by the "normal" energy utilization between 1 PM and 3 PM to obtain a new energy usage pattern for the time period. The data processing system may similarly assign coefficients to different time frames of the time period to adjust the expected energy of each of the time frames. In this way, the data processing system may account for outside factors to determine whether, and to what extent, the first consumer load will overutilize or underutilize energy during the time period.

In some cases, a consumer load's energy usage may be relatively unpredictable (e.g., sporadic). In these case, the data processing system may track cumulative energy consumption during the time period and fit a curve (e.g., linear, polynomial, etc.) to the cumulative energy consumption.

The data processing system may project whether the first energy load's usage will remain within the allocated amount of energy by calculating a sum of the amount of energy the first consumer load will utilize from the points on the curve. The data processing system may generate fitted curves at set times throughout the time period to monitor if the first consumer load is predicted to overutilize or underutilize energy during the time period (e.g., determine if the total amount of energy that the first consumer load is predicted to utilize for the time period at the end of the curve exceeds the allocation for the first consumer load at each of the set times). If at any of the set times the data processing system determines the total amount of energy exceeds the allocation for the time period for the first consumer load, the data processing system may determine the first consumer load is predicted to overutilize energy that the data processing system directs to the first consumer load.

Upon determining that the first consumer load is on track to exceed its allocation, at operation 524, the data processing system may transmit an alert indicating the overutilization to a device of a user that is associated with the first consumer load. In some embodiments, the data processing system may transmit the alert immediately upon determining the first consumer load is on track to exceed its allocation. In some embodiments, instead of immediately transmitting the alert, the data processing system may wait for a period of time to determine if the high usage is an anomaly and usage will revert to normal. The data processing system may continue monitoring the energy utilization of the first consumer load throughout a time frame within the time period using the methods described above. If the data processing system determines the first consumer load is still on track to overutilize energy directed to it by the data processing system at the end of the time frame, the data processing system may determine an expected amount of overutilization if the first consumer load's energy usage were to continue at the same rate (or the same trajectory in the case of a fitted curve). The data processing system may do so, for example, by multiplying the time left in the time period by the utilization rate to determine a remaining expected energy usage and adding the remaining expected energy usage to the current energy usage of the first consumer load during the time period.

In some embodiments, in addition to or instead of determining the expected amount of overutilization, the data processing system may determine a time that the first consumer load will utilize an aggregate amount of energy to reach the amount of energy that was allocated to the first consumer load. The data processing system may do so by subtracting the current energy usage for the time period from the first energy limit to obtain a remaining allocated energy. The data processing system may then divide the remaining allocated energy by the determined rate at which the first consumer load is utilizing energy to determine a remaining utilization time that the first consumer load has until it utilizes energy to the first energy limit. The data processing system may add the remaining utilization time to the current time to determine an overutilization time at which the first consumer load will use all of its allocated amount of energy.

The data processing system may generate an alert that includes an indication that the first consumer load is on track to overutilize the energy that the data processing system is directing to the first consumer load, an indication of the expected amount of overutilization of the first consumer load, and/or the overutilization time at which the first consumer load will reach the first energy limit. In some embodiments, the alert include a string indicating to utilize less energy for a remainder of the time period. The data processing system may include the data for the alert in a body of a message and transmit the message to the device of the user that is associated with the first consumer load.

In another example, the data processing system may determine if the first consumer load is on track to underutilize or overutilize the energy that the data processing system directs to the first consumer load. For instance, the first consumer load might begin to use energy at a 2 kW rate during the mid-morning, when there are still 21 hours of the day remaining. Assuming the first consumer load has consumed 3 kWh in the earlier hours, the first consumer load would now be on track to consume 45 kWh during the course of the full day, well in excess of its allocation. The data processing system may use any method to determine if a consumer load has or is on track to overutilize or underutilize the energy that the data processing system directs to the consumer load.

At operation 526, the data processing system may determine if the energy allocation is reached. The data processing system may determine if the energy allocation is reached for the first consumer load at multiples times throughout the time period. The data processing system may do so by comparing the current energy usage of the first consumer load to the energy allocation at set intervals until the end of the time period. If the data processing system determines the first consumer load does not utilize enough energy to reach its energy allocation, the data processing system may end performance of method 518 or proceed to operation 530. However, if the data processing system determines the first consumer load utilizes enough energy to reach or exceed the energy allocation for the first consumer load, at operation 528, the data processing system may terminate distribution of energy to the first consumer load. The data processing system may do so by stopping directing energy to the first consumer load (e.g., control the microgrid to stop delivering energy to the first consumer load or disconnecting the first consumer load from the microgrid).

If at operation 522 the data processing system determines the first consumer load underutilizes energy compared to the amount of energy the data processing system allocated the first consumer load, at operation 530, the data processing system calculates an excess amount of energy. The data processing system may calculate the excess amount of energy by first determining an expected amount of energy that the first consumer load will utilize during the time period. The data processing system may do so using similar methods to those described above. The data processing system may then calculate the excess energy as the difference between the expected energy and the amount of energy the data processing system allocated to the first consumer load (e.g., subtract the expected amount of energy that the first consumer load will utilize from the allocated amount of energy).

In some embodiments, the data processing system may generate an alert that includes an indication that the first consumer load is on track to underutilize the energy that the data processing system is directing to the first consumer load, and/or an indication of the expected amount of underutilization (e.g., the excess amount of energy) of the first consumer load. The data processing system may include the data for the alert in a body of a message and transmit the message to the device of the user that is associated with the first consumer load.

At operation 532, the data processing system allocates the excess energy to other consumer loads to which the data processing system directs energy. The data processing system may allocate the excess energy by increasing the amounts of energy that the data processing system had previously allocated to the other consumer loads for the time period. The data processing system may allocate the excess energy using a few methods. In one method, the data processing system may implement a re-sharing mechanism based on a ratio of the excess energy to the energy allocation of another consumer load (e.g., the second consumer load). For example, the data processing system may allocate the excess energy to other consumer loads according to the equation:

((recipient consumer load's energy allocation for the time period)+(excess energy being allocated))/ (recipient consumer load's energy allocation for the time period).

This approach could be applied if, for example, a user associated with the first consumer load sold the excess energy to a user of another consumer load.

In another example, the data processing system may allocate the excess energy by dividing the excess energy between two or more users. In some cases, the data processing system may do so in proportion to each consumer load's energy allocation (e.g., increase the allocations of consumer loads with a high allocation by a larger amount than allocations of consumer loads with a low allocation). In some cases, the data processing system may do based on how much the users of the individual consumer loads wish to purchase.

In another example, in a situation in which multiple consumer loads were assigned different priorities, the energy allocation method may follow a priority-based energy allocation method similar to the initial energy allocation described above. In this example, the data processing system may not provide any of the excess energy to the consumer loads for which the data processing system allocated enough energy to reach the energy limit associated with the respective consumer loads. Instead, the data processing system may allocate the excess energy to the consumer loads for which the data processing system allocated less energy than the energy limits of the consumer loads similar to the above (e.g., identify and allocate the excess energy to the highest priority consumer load that was not allocated an energy load to its energy limit, identify and allocate remaining excess energy to the next highest priority consumer load, etc.).

At operation 534, the data processing system may direct the excess energy to the consumer loads according to their allocations. The data processing system may do so similar to how the data processing system directed energy to the consumer loads in operation 516, shown and described with reference to FIG. 5A, but with the updated allocations.

In some implementations, the data processing system may be configured to dynamically change the energy allocations to the consumer loads based on a change in expected weather (or any other reason for a change in energy generation) for the time period. For example, in some cases, the renewable energy sources of the microgrid may generate less energy than expected during the time period as a result of a change in weather (e.g., a sudden cloudy day when the data processing system forecast energy generation based on a sunny day). The data processing system may detect less energy is being generated by monitoring the renewable energy sources to determine if the renewable energy sources generated the amount of energy that was expected during the time period. At predefined points in time of the time period, the data processing system may compare the amount of energy that has been generated to the forecast amount for that point in time. If the data processing system determines less energy has been generated, the data processing system may reduce the energy allocations to the consumer loads in reverse order based on the priorities of the consumer loads.

For example, upon detecting less energy has been generated than forecast, the data processing system may determine how much less energy has been generated by comparing the total amount generated to the expected amount generated. The data processing system may determine a difference (or a deficiency) based on the comparison. The data processing system may identify the consumer load with the lowest priority that was allocated energy and lower the allocation by the determined difference. If lowering the allocation by the difference causes the allocation to be zero and there is allocated energy that still needs to be lowered (e.g., the difference was higher than the previously allocated energy for the consumer load), the data processing system may identify the next lowest priority consumer load that was allocated energy and lower the allocation by the remaining difference. The data processing may continue this process until the data processing system has accounted for the all of the difference between the amount of energy that was expected to be generated by the time point and the actual amount of energy that was generated. The data processing system may perform this process at each of the set points in time for which the renewable energy sources generate less energy than predicted throughout the time period, thus ensuring the highest prioritized consumer loads receive enough energy to operate.

The data processing system may similarly increase allocations of energy if the data processing system determines the renewable energy sources have generated more energy than expected by the different points in time. In doing so, the data processing system may determine an amount of extra energy the data processing system has generated by a point in time compared to the amount of energy that was expected to be generated by the point in time. The data processing system may then increase the energy allocations to the consumer loads according to their priorities beginning with the highest priority consumer load that was not allocated an amount of energy to its limit. The data processing system may do so using the systems and methods described herein until there is not any extra energy to allocate. The data processing system may perform this reallocation process for each point in time for which the renewable energy sources generate more energy than predicted. Thus, the data processing system can ensure all of the energy that the renewable energy sources generates is allocated.

Accordingly, by implementing the systems and methods described herein, a data processing system may control the energy output of a microgrid to power different consumer loads to make sure the consumer loads with the highest priority are powered despite variations in how much energy the renewable sources that energize the microgrid (in some cases as an island) can generate. An operator may customize the configuration of the data processing system to implement sets of rules to prioritize different consumer loads depending on the operator's preferences. Further, the data processing system may adjust energy distribution from the microgrid in real-time as the data processing system determines overutilization and underutilization at different consumer loads to account for unpredictable usage patterns at the consumer loads and/or unpredictable weather events.

In the above description, it is assumed that the energy generated by the RES, plus any energy that is available from the ESS, is available to be delivered to loads at any time. Some issues may arise based on this assumption. One, it is assumed that the ESS always has available capacity to store energy. Second, there are round-trip losses in the ESS: if the RES energy needs to be delivered to the load at a later time, it needs to be available from the ESS, and there will be energy lost in the round trip. Because the amount of energy that will go through the ESS may not be known in advance, this introduces some uncertainty in the amount of energy available. Third, if energy needs to be delivered in the short term, and exceeds the energy available from the ESS (and the amount of energy that will be generated by the RES in the short term), the system might be unable to deliver the energy when needed.

Various design techniques can be used to address the each of these issues. First, the ESS may be configured to store enough energy to provide energy to each consumer load and, additionally, to handle energy lost during the round-trip. Second, for computational purposes, it may be assumed that all of the energy that is generated by the RES will be stored in the ESS so the round-trip losses affect all generated energy. In practice, this may usually not be the case and this approach may be overly conservative. However, it is a design technique that could be used to make computations more efficient for the processor allocating energy. Third, a method can be used to minimize energy allocations to the various loads. The method may include: (1) forecasting the state of charge of the ESS through the forecast period (e.g., the time period); (2) identifying whether the ESS is forecast to reach a zero state of charge at any time; (3) determining when the ESS will again begin to charge; and (4) dividing the forecast period into two parts, with the separating time being the time determined at operation (3), and then running the energy allocation system for each of those parts separately (it may be necessary to iterate if the ESS would reach zero charge more than once). This should reduce energy allocations to the various loads, so that together they never exceed the energy available during each sub-period.

Computer Systems

Figure 2:
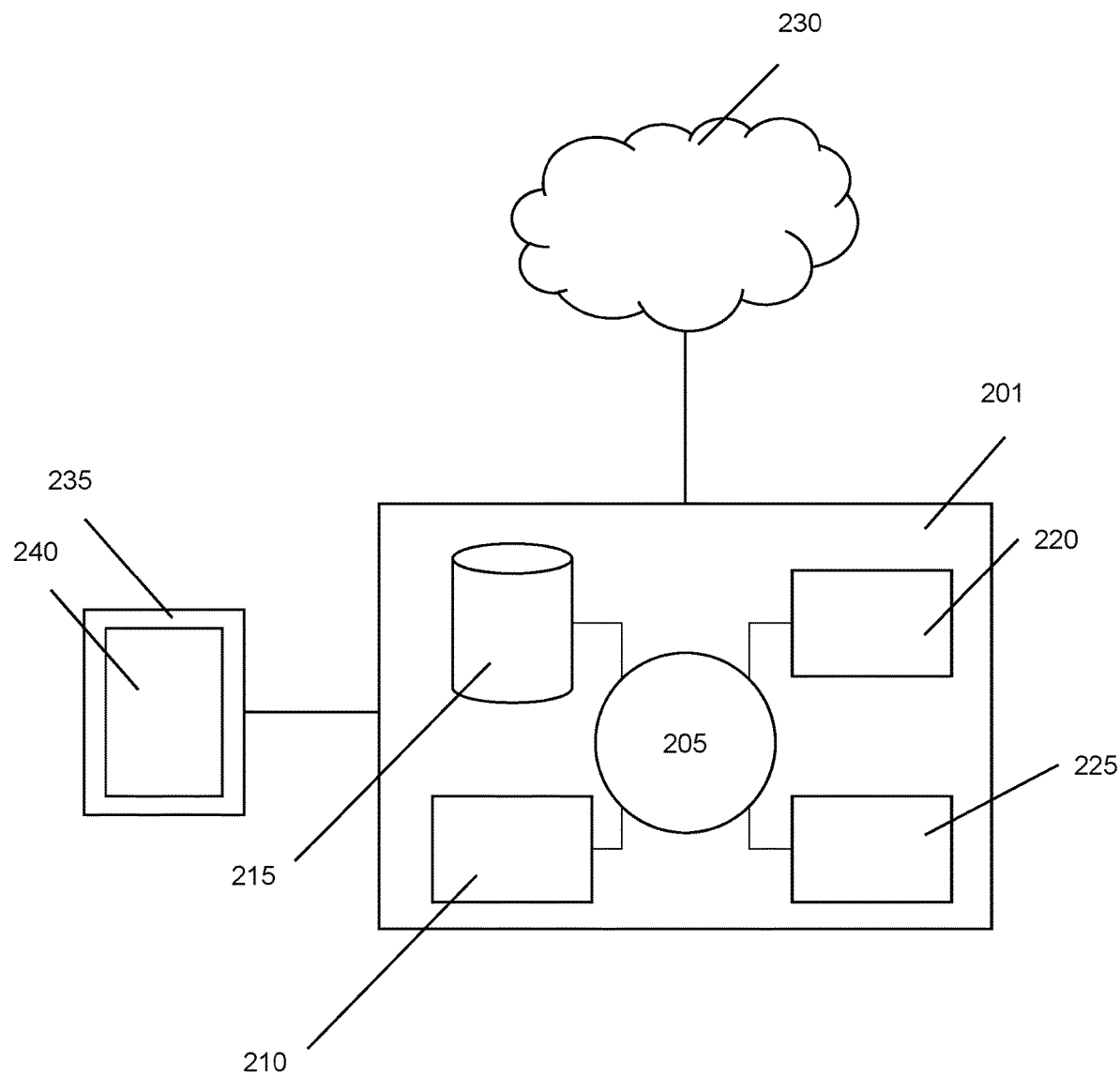
FIG. 2 shows a computer system that is programmed or otherwise configured to implement methods provided herein, in accordance with some embodiments.

The present disclosure provides computer systems that are programmed to implement methods of the disclosure. FIG. 2 shows a computer system 201 that is programmed or otherwise configured to manage electrical energy generated by a renewable microgrid, as described herein. The computer system 201 can be an electronic device of a user or a computer system that is remotely located with respect to the electronic device. The electronic device can be a mobile electronic device.

The computer system 201 includes a central processing unit (CPU, also "processor" and "computer processor" herein) 205, which can be a single core or multi core processor, or a plurality of processors for parallel processing. The computer system 201 also includes memory or memory location 210 (e.g., random-access memory, read-only memory, flash memory), electronic storage unit 215 (e.g., hard disk), communication interface 220 (e.g., network adapter) for communicating with one or more other systems, and peripheral devices 225, such as cache, other memory, data storage and/or electronic display adapters. The memory 210, storage unit 215, interface 220 and peripheral devices 225 are in communication with the CPU 205 through a communication bus (solid lines), such as a motherboard. The storage unit 215 can be a data storage unit (or data repository) for storing data. The computer system 201 can be operatively coupled to a computer network ("network") 230 with the aid of the communication interface 220. The network 230 can be the Internet, an internet and/or extranet, or an intranet and/or extranet that is in communication with the Internet. The network 230 in some cases is a telecommunication and/or data network. The network 230 can include one or more computer servers, which can enable distributed computing, such as cloud computing. The network 230, in some cases with the aid of the computer system 201, can implement a peer-to-peer network, which may enable devices coupled to the computer system 201 to behave as a client or a server.

The CPU 205 can execute a sequence of machine-readable instructions, which can be embodied in a program or software. The instructions may be stored in a memory location, such as the memory 210. The instructions can be directed to the CPU 205, which can subsequently program or otherwise configure the CPU 205 to implement methods of the present disclosure. Examples of operations performed by the CPU 205 can include fetch, decode, execute, and writeback.

The CPU 205 can be part of a circuit, such as an integrated circuit. One or more other components of the system 201 can be included in the circuit. In some cases, the circuit is an application specific integrated circuit (ASIC).

The storage unit 215 can store files, such as drivers, libraries and saved programs. The storage unit 215 can store user data, e.g., user preferences and user programs. The computer system 201 in some cases can include one or more additional data storage units that are external to the computer system 201, such as located on a remote server that is in communication with the computer system 201 through an intranet or the Internet.

The computer system 201 can communicate with one or more remote computer systems through the network 230. For instance, the computer system 201 can communicate with a remote computer system of a user (e.g., a database, an enterprise or extraprise system, an Internet-of-Things (IoT) device, a sensor, or the like). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 201 via the network 230.

Methods as described herein can be implemented by way of machine (e.g., computer processor) executable code stored on an electronic storage location of the computer system 201, such as, for example, on the memory 210 or electronic storage unit 215. The machine executable or machine-readable code can be provided in the form of software. During use, the code can be executed by the processor 205. In some cases, the code can be retrieved from the storage unit 215 and stored on the memory 210 for ready access by the processor 205. In some situations, the electronic storage unit 215 can be precluded, and machine-executable instructions are stored on memory 210.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 201, can be embodied in programming. Various aspects of the technology may be thought of as "products" or "articles of manufacture" typically in the form of machine (or processor) executable code and/or associated data that is carried on or embodied in a type of machine-readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine-readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 201 can include or be in communication with an electronic display 235 that comprises a user interface (UI) 240 for providing, for example, a graphical representation of a renewable microgrid. For example, the graphical representation could be a graphical representation of a renewable microgrid system as illustrated in FIG. 1. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 205. The algorithm can, for example, assist the EMS in allocating energy from the RES and ESS to the renewable microgrid. The algorithm can also, for example, forecast an amount of electrical energy available from the RES and ESS for a plurality of time periods. The algorithm can also, for example, allocate the available electrical energy to the one or more consumer loads of the renewable microgrid. The algorithm can also, for example, forecast an energy consumption of the one or more consumer loads over a forecast period.

EXAMPLES

Figure 3A:
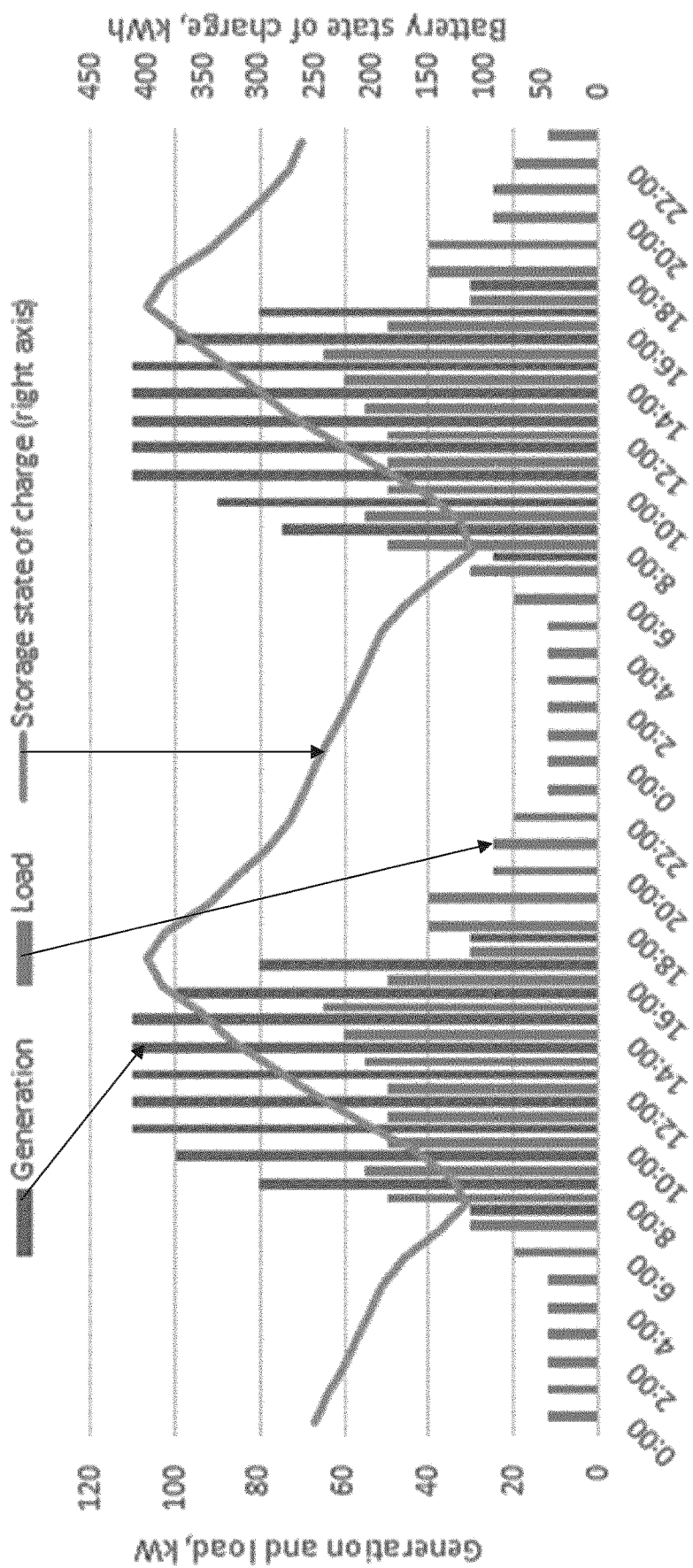
FIG. 3A is a graph illustrating the relationship of renewable energy generation, consumer loads, and a state of charge of an energy storage system in a renewable microgrid, in accordance with some embodiments.

Example 1: The Relationship of Renewable Energy Generation, Consumer Loads, and a State of Charge of an Energy Storage System in a Renewable Microgrid FIG. 3A illustrates the relationship of renewable energy generation, consumer loads, and a state of charge of an energy storage system in a renewable microgrid.

In this example, the RES is a solar array. It generates energy daily between 8:00 am and 6:00 pm and generates no energy from 7:00 pm through 7:00 am.

There is at least some consumer load throughout the full day and night, with one peak load period occurring at 8:00 am, a second peak load period at 4:00 pm, and a third peak load period in the early evening. As shown, night-time energy demand is relatively low.

The ESS reaches its peak state of charge at approximately 5:00 pm on each day shown, after a long period when the RES electrical energy generation has exceeded the total level of consumer energy demand on the microgrid. At approximately 5:00 pm, the RES electrical energy generation falls to the level of the total consumer energy demand on the microgrid. The ESS then discharges through the night until it reaches a minimum state of charge at 8:00 am, when the instantaneous generation output of the RES begins to exceed the total consumer energy demand, causing the ESS to begin to charge again.

In this example, a natural forecast period would be from any starting time through 5am the following morning. Additionally, a second natural forecast period would be from any starting time through 5am the morning after that (to allow for day-of-week and short-term weather considerations).

Figure 3B:
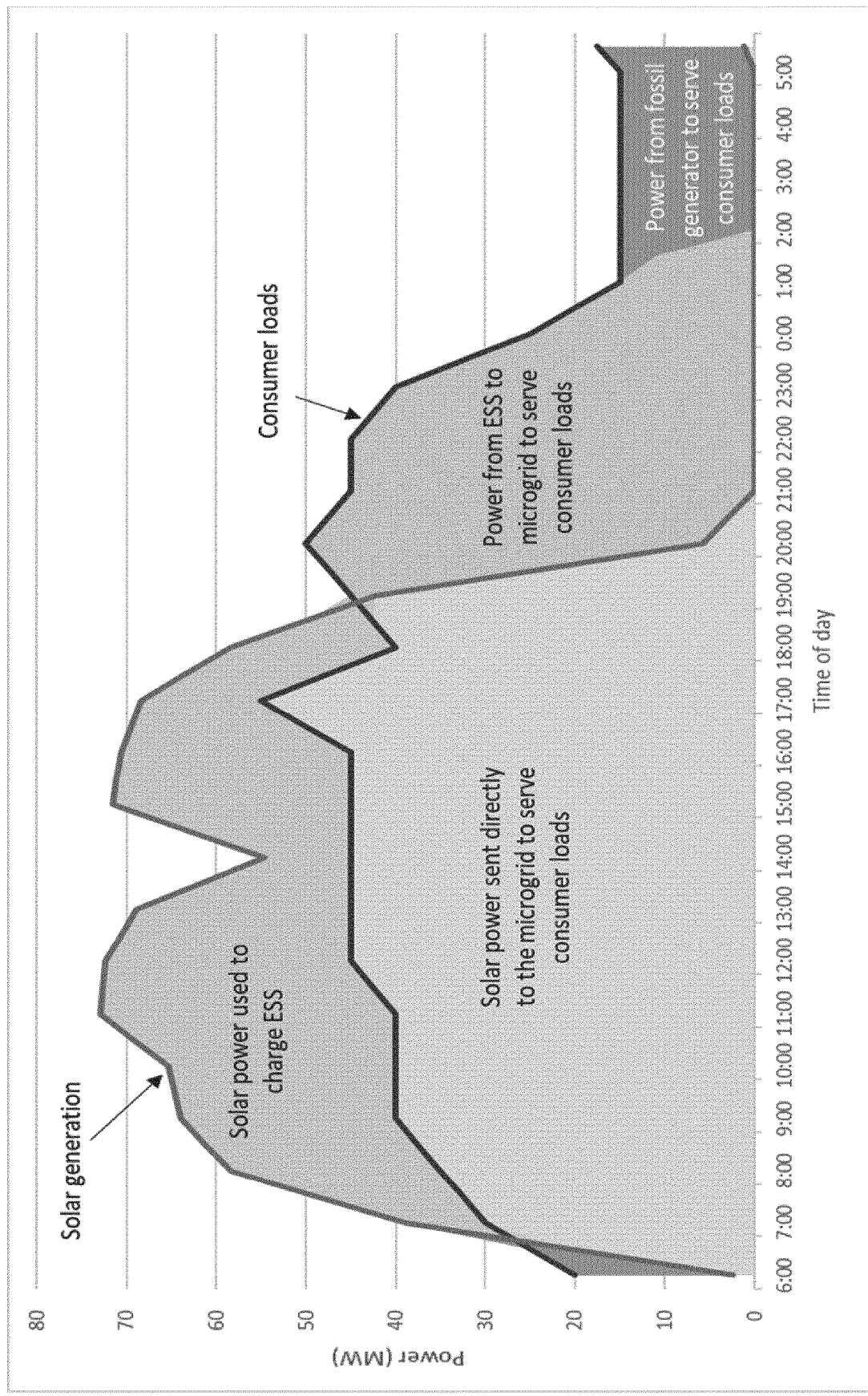
FIG. 3B shows an example of sources and uses of energy in a conventional microgrid system, in accordance with some embodiments.

FIG. 3B shows an example of sources and uses of power in a conventional microgrid system. In the example, a single representative 24-hour period, starting at 6 am and completing at 6 am the following morning is shown.

The solid green line ("solar generation") represents the power generated by the solar resource throughout the course of the day. The chart shows a dip in the output between 1 pm and 3 pm to represent a weather-related event that reduces output below its seasonal average for the day. The solid red line ("consumer loads") represents the aggregated electrical loads presented by consumers connected to the microgrid. The shaded areas in the chart shows: the yellow area below the (red) consumer load curve ("solar power sent directly to the microgrid to serve consumer loads") represents solar power, generated by the solar resource, that is used to serve consumer loads between 6 am and 8-9 pm. Between 7 am and 7 pm, the solar resource produces more power than is needed to serve the consumer loads, and this power is used to charge the ESS. The power is stored in the ESS ("solar power used to charge ESS"). From 7 pm until 2 am, power is discharged from the ESS to meet the electrical demands of the consumer loads ("power from ESS to microgrid to server consumer loads").

By shortly after 2 am, the power in the ESS has been exhausted. There is no solar resource available at night, thus between 2 am and 7 am the demands of the consumer loads is met by a fossil-fueled generator connected to the microgrid ("power from fossil generated to serve consumer loads"). This power may also be obtained through a connection to a larger electrical grid.

In the example of an islanded all-renewable microgrid, having neither fossil-fueled generation attached nor a connection to a larger electrical grid, the area shaded grey ("power from fossil generated to serve consumer loads") may represent times during the early morning when the microgrid may be unable to meet the needs of the electrical loads connected to it. Instead, it may stop providing power to the loads.

Figure 3C:
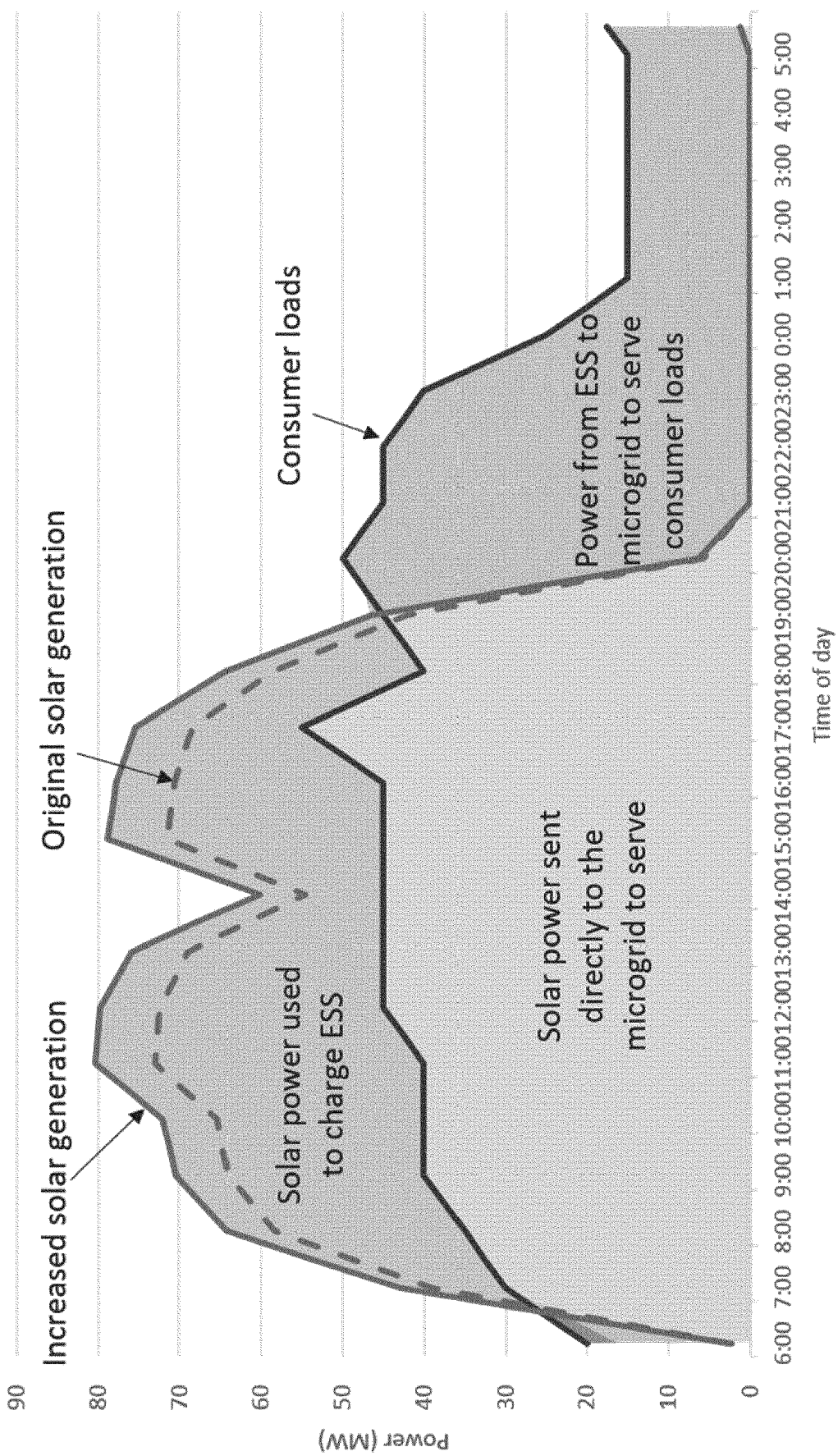
FIG. 3C shows an example of an "islanded" microgrid that relies only on renewable energy, in accordance with some embodiments.

FIG. 3C shows an example of "islanded" microgrid (i.e., microgrid with no connection to a larger electrical grid) that relies only on renewable energy (e.g., does not have a fossil-fueled source of power). Such microgrid may address the problem of lower-than-expected power production by the solar resource (e.g., due to weather). In this example, power capacity of the renewable (e.g., solar) resource is increased, so that on an average day it may produce more power than is required, and on days of poor weather the resource may produce enough energy to serve the needs of the loads on the microgrid. This is achieved by oversizing the renewable source. However, as described above, relying on oversizing the resource alone may not achieve satisfactory results. For example, such approach may not guarantee that the loads can be served. For instance, if the weather is worse than planned, or the underproduction by the renewable source is more severe than planned, the renewable source may fail to produce enough power to serve the loads. In practice, the microgrid designer has to determine how often it is acceptable for the system to fail to serve the load, in order to determine the required oversizing of the renewable source. Additionally, as the requirement for the load-service percentage increases, the required degree of oversizing increases thus increasing the cost of the microgrid.

Figure 3D:
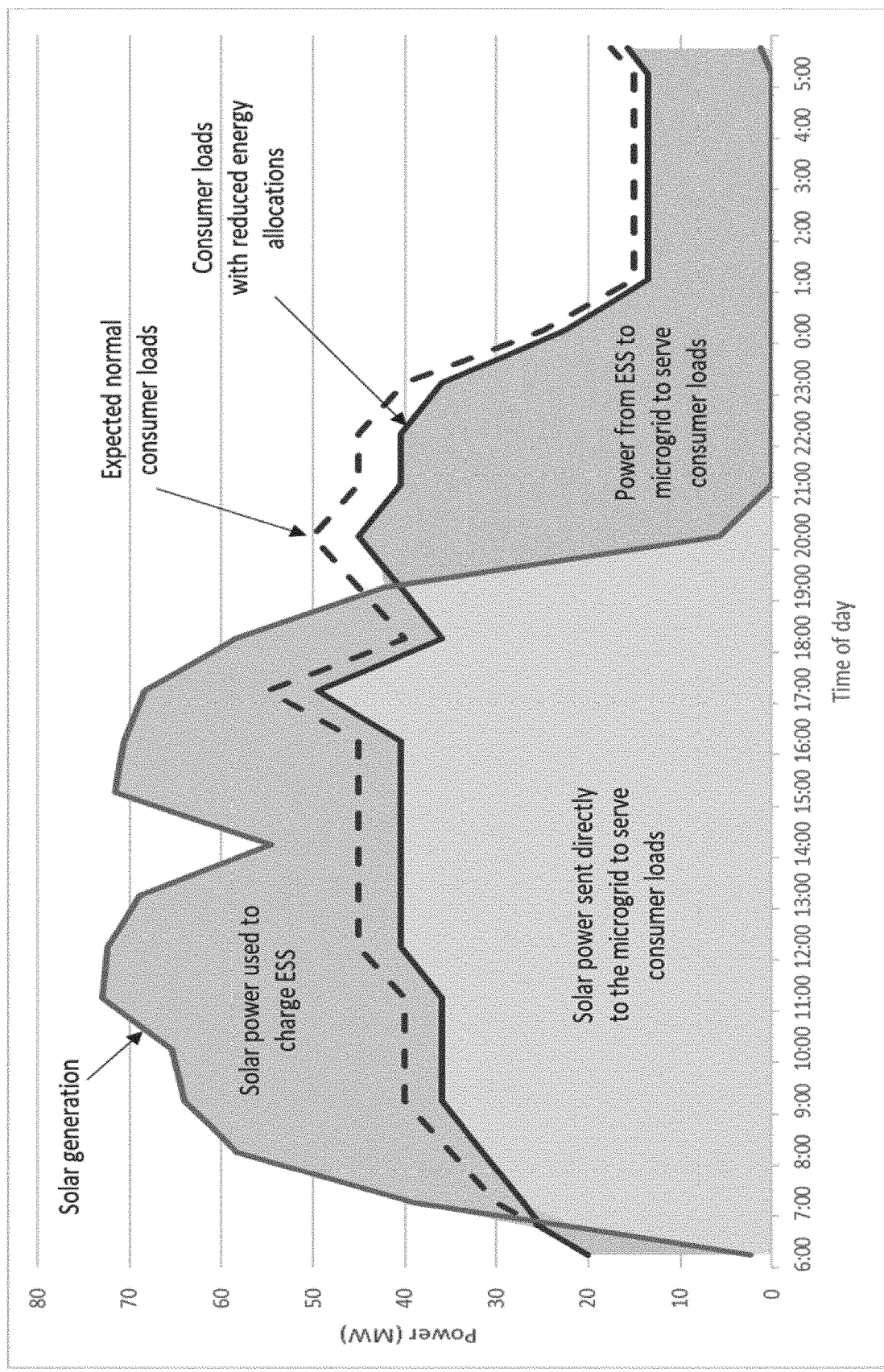
FIGS. 3D-3F show examples of an all-renewable islanded microgrid improved by the systems and methods herein, in accordance with some embodiments.
Figure 3E:
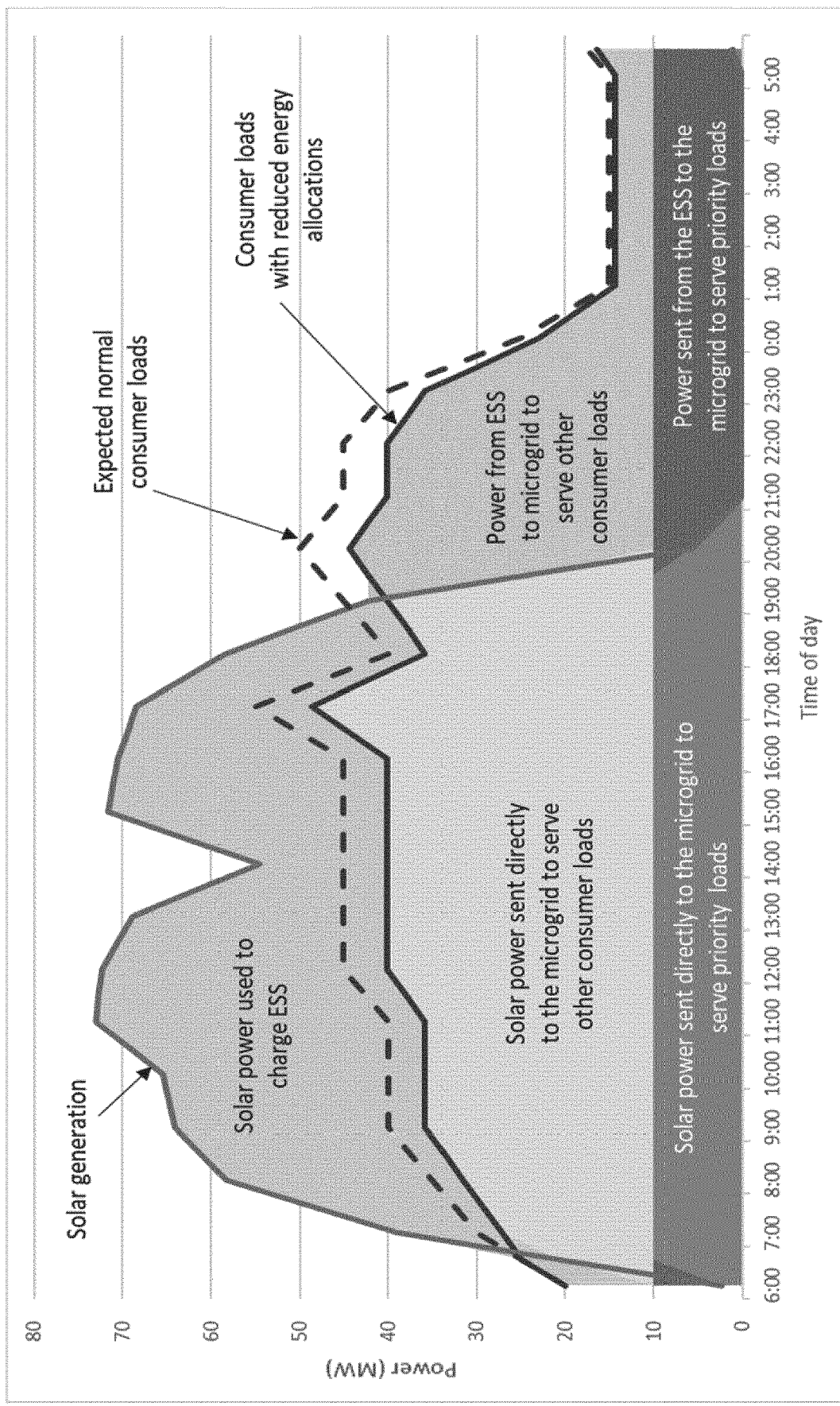
Figure 3F:
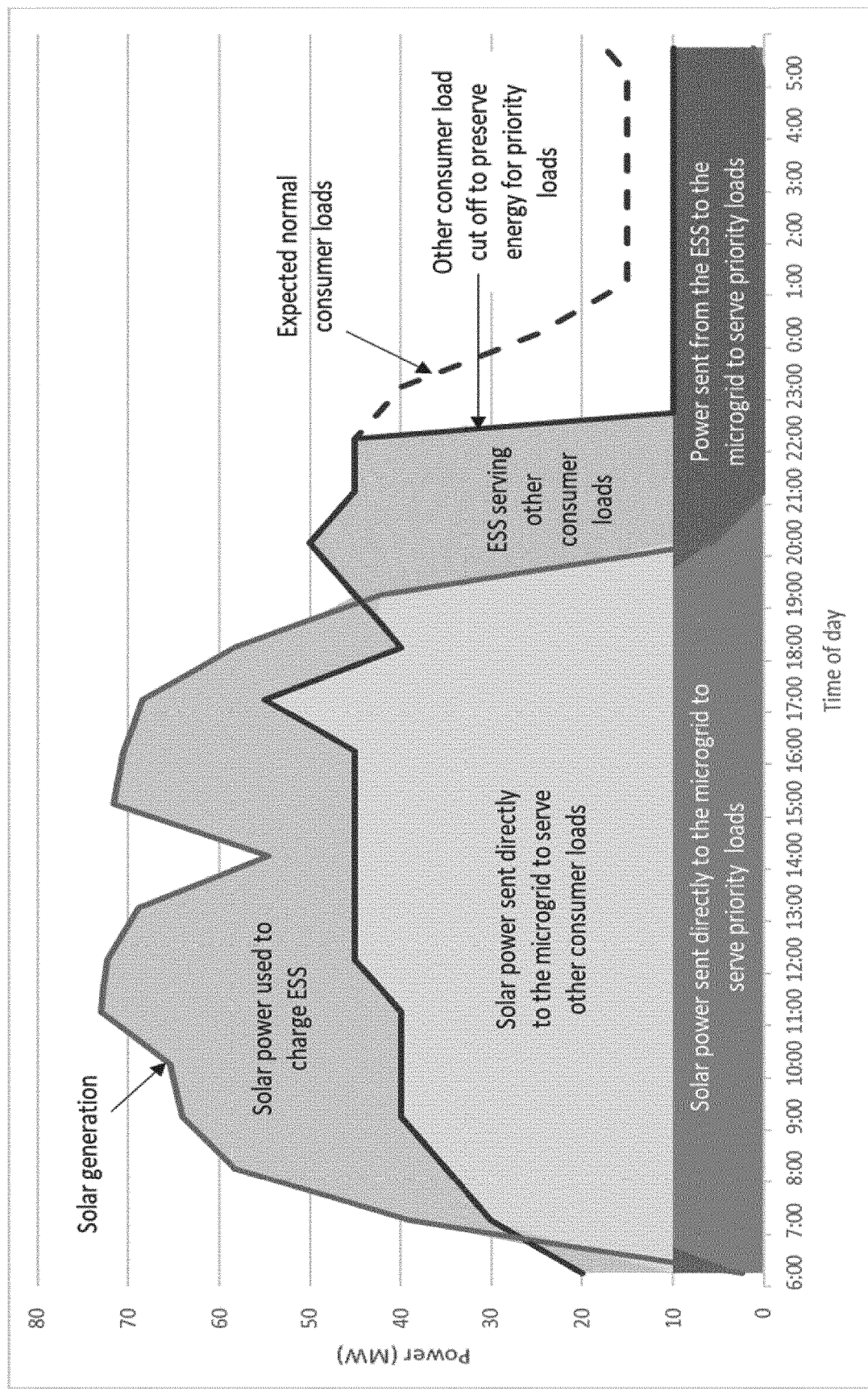

FIGS. 3D-F show examples of all-renewable islanded microgrid improved by the systems and methods herein. As described above, the system may reduce the degree of oversizing the renewable source and reduce the degree of consumer power consumption curtailment by at least including the active meters and EFAS. FIG. 3D shows an all-renewable islanded microgrid (e.g., microgrid with no fossil-fueled generator and no connection to a larger electrical grid). The dashed red line ("expected normal consumer load") represents the normally expected consumer loads on the microgrid, given the particular time of year, day of week, forecast temperature, and the like. There is a weather event expected in the early afternoon, which may reduce the total power production of the solar resource below its typical level. The system herein may provide the benefit of the forecast for under-production by the solar resource. For example, early in the day the EFAS of the system may notify consumers to reduce their power consumption moderately, providing them with guidance on how much they should reduce their consumption such as in absolute terms, relative to normal consumption, or a combination of both.

Upon receiving the notification, the consumers may reduce their power consumption in the forecast period, the microgrid's solar resource may produce enough power to meet the reduced consumer demand throughout the forecast period while portions of the power may be time-shifted using the ESS (i.e., solar power used to charge ESS). The solid red line ("consumer loads with reduced energy allocation") represents the realized consumer loads, after consumers have responded to the notification from the EFAS.

Compared to the scenario illustrated in FIG. 3B, consumers are able to receive power from the microgrid throughout the course of the day even without any fossil-fueled generation or connection to a larger electrical grid. Compared to the scenario illustrated in FIG. 3C which relying only on oversizing the solar resource, the provided system and method beneficially ensures electrical service at all times at a lower cost.

FIG. 3E shows an example of all-renewable islanded microgrid with some of the connected loads are designated as priority loads. For example, the priority loads may be a medical facility and/or a food storage refrigeration facility. It may be highly undesirable to reduce the power delivered to a priority load below its desired levels. The EFAS may allocate projected power production among consumers, while prioritizing some consumers over others. The EFAS of the system may direct power to the priority loads so that they receive a constant power level throughout the day. Even when an early afternoon weather event is expected to reduce the power produced by the solar resource during the forecast period, the EFAS may not request a reduction in the total power consumed by, or delivered to the priority loads. The EFAS may also notify the other consumers (e.g., non-priority, or lower-priority consumers) to make a proportionally larger reduction in their power consumption, relative to the normal consumption level. As shown in the example, upon receiving the notification, the consumers may reduce the consumption, the solar resource and ESS may be controlled to supply power and power to meet the reduced consumer load throughout the day.

In the cases when consumers (e.g., non-priority consumers) fail to comply with the notification or fail to reduce their electrical power consumption below normal level to meet the reduced energy allocations, the EFAS may disconnect the non-priority loads to reserve enough power in the ESS to serve the priority loads throughout a period of time. FIG. 3F shows an example of the EFAS automatically disconnect the non-priority loads to provide an optimal energy allocation throughout the microgrid and the times of the day. In the illustrated example, between 10 pm and 11 pm the EFAS may disconnect the non-priority loads (e.g., when the non-priority consumers fail to comply with the notification), to reserve enough power in the ESS to serve the priority loads throughout the night, until the next morning. The EFAS may disconnect consumers who are about to exceed their energy allocations, to preserve power to serve higher-priority consumers. The EFAS may be capable to distinguish non-priority consumers who are on a trajectory to stay within their (reduced) energy allocations from others who are not, the EFAS may then disconnect those consumers who are about to exhaust their energy allocations to reserve energy in the ESS to serve both the priority loads and the consumers who are remaining within their energy allocations.

While preferred embodiments of the present disclosure have been shown and described herein, it will be obvious to those skilled in the art that such embodiments are provided by way of example only. It is not intended that the disclosure be limited by the specific examples provided within the specification. While the disclosure has been described with reference to the aforementioned specification, the descriptions and illustrations of the embodiments herein are not meant to be construed in a limiting sense. Numerous variations, changes, and substitutions will now occur to those skilled in the art without departing from the disclosure. Furthermore, it shall be understood that all aspects of the disclosure are not limited to the specific depictions, configurations or relative proportions set forth herein which depend upon a variety of conditions and variables. It should be understood that various alternatives to the embodiments of the disclosure described herein may be employed in practicing the disclosure. It is therefore contemplated that the disclosure shall also cover any such alternatives, modifications, variations or equivalents. It is intended that the following claims define the scope of the disclosure and that methods and structures within the scope of these claims and their equivalents be covered thereby.

What is claimed is:

1. A system for managing electrical energy generated by a renewable micro utility, comprising one or more computer processors operatively coupled to computer memory and configured by machine-readable instructions to:
   store one or more priorities and one or more energy limits for one or more consumer loads in the computer memory;
   forecast an amount of electrical energy available from a renewable energy system (RES) and an energy storage system (ESS) for a time period;
   allocate a first electrical energy amount to a first consumer load of the one or more consumer loads and a second electrical energy amount to a second consumer load of the one or more consumer loads based on the stored one or more priorities and the one or more energy limits and for the time period; and
   direct electrical energy from the RES or the ESS to the first and second consumer loads according to the allocated first electrical energy amount and second electrical energy amount.

2. The system of claim 1, wherein the one or more computer processors are further configured by the machine-readable instructions to determine a priority for each of the one or more consumer loads based on prioritization criteria.

3. The system of claim 2, wherein the one or more computer processors are configured by the machine-readable instructions to determine the priority for each of the one or more consumer loads based on the prioritization criteria by determining the priority based on pricing tiers, determinations of need, household/building size, type of home/building, geographic location of the home/building, or demographic information of each of the one or more consumer loads.

4. The system of claim 1, wherein the one or more computer processors are configured by the machine-readable instructions to determine a priority for each of the one or more consumer loads by determining the priority based on a type of each of the one or more consumer loads.

5. The system of claim 4, wherein the one or more computer processors are configured by the machine-readable instructions to determine the priority for each of the one or more consumer loads by assigning consumer loads of the one or more consumer loads that correspond to medical facilities that contain temperature-sensitive medications or supplies a higher priority than all other consumer loads of the one or more consumer loads.

6. The system of claim 4, wherein the one or more computer processors are configured by the machine-readable instructions to determine the priority for each of the one or more consumer loads based on values that are associated with each of the one or more consumer loads.

7. The system of claim 1, wherein the one or more computer processors are further configured by the machine-readable instructions to:
   determine a third priority for a third consumer load is identical to a fourth priority for a fourth consumer load;
   responsive to the determination that the third priority is identical to the fourth priority, calculate a third electrical energy amount and a fourth electrical energy amount according to a ratio of a third energy limit of the third electrical energy amount to a fourth energy limit of the fourth electrical energy amount or such that the third electrical energy amount is equal to the fourth electrical energy amount; and
   allocate the third electrical energy amount to the third consumer load for the time period and the fourth electrical energy amount to the fourth consumer load for the time period.

8. The system of claim 1, wherein the one or more computer processors are further configured by the machine-readable instructions to:
   determine the forecast amount of electrical energy is not enough to allocate electrical energy to a second energy limit to the second consumer load for the time period; and
   responsive to the determination, allocate an electrical energy amount of zero to each consumer load of the one or more consumer loads that has a priority that is lower than the priority of the second consumer load.

9. The system of claim 1, wherein the one or more computer processors are configured by the machine-readable instructions to allocate the first electrical energy amount to the first consumer load by storing an indication of the first electrical energy amount in the computer memory.

10. The system of claim 1, wherein the one or more computer processors are further configured by the machine-readable instructions to:
    determine the forecast amount of electrical energy is not enough to allocate enough electrical energy to the second consumer load for the time period; and
    reduce a previously assigned energy limit for each of the one or more consumer loads responsive to the determination.

11. The system of claim 10, wherein the one or more computer processors are configured by the machine-readable instructions to reduce the previously assigned energy limit for each of the one or more consumer loads based on the stored one or more priorities for the one or more consumer loads.

12. The system of claim 1, wherein the one or more computer processors are configured by the machine-readable instructions to:
    during the time period:
       determine the allocated first electrical energy amount is higher than an amount of energy the first consumer load will utilize during the time period;
       calculate an excess energy by calculating a difference between the allocated first electrical energy amount and the amount of energy the first consumer load will utilize during the time period; and
       allocate the excess energy to other consumer loads of the one or more consumer loads.

13. The system of claim 12, wherein the one or more computer processors are configured by the machine-readable instructions to allocate the excess energy to other consumer loads by increasing the allocation of the second electrical energy amount until the second electrical energy amount reaches a second energy limit.

14. The system of claim 12, wherein the one or more computer processors are configured by the machine-readable instructions to transmit a message to a device associated with a user of the first consumer load, the message comprising a string indicating the first consumer load is on track to use less energy than the allocated first electrical energy amount.

15. The system of claim 1, wherein the one or more computer processors are configured by the machine-readable instructions to:
- during the time period:
  - determine an amount of energy that has been directed to the first consumer load has reached the allocated first electrical energy amount; and
  - terminate distribution of energy to the first consumer load responsive to the determination.

16. The system of claim 1, wherein the one or more computer processors are configured by the machine-readable instructions to:
- during the time period:
  - determine an amount of energy that has been directed to the first consumer load is within a threshold of the allocated first electrical energy amount; and
  - responsive to the determination, transmit a message to a device associated with a user of the first consumer load, the message comprising a string indicating to utilize less energy for a remainder of the time period.

17. A method for managing electrical energy generated by a renewable micro utility comprising a renewable energy system ("RES") and an energy storage system ("ESS"), the method comprising:
- storing one or more priorities and one or more energy limits for one or more consumer loads in a computer memory;
- forecasting an amount of electrical energy available from a renewable energy system (RES) and an energy storage system (ESS) for a time period;
- allocating a first electrical energy amount to a first consumer load of the one or more consumer loads and a second electrical energy amount to a second consumer load of the one or more consumer loads based on the stored one or more priorities and the one or more energy limits and for the time period; and
- directing electrical energy from the RES or the ESS to the first and second consumer loads according to the allocated first electrical energy amount and second electrical energy amount.

18. The method of claim 17, further comprising determining a priority for each of the one or more consumer loads based on prioritization criteria.

19. The method of claim 18, wherein determining the priority for each of the one or more consumer loads based on the prioritization criteria comprises determining the priority based on pricing tiers, determinations of need, household/building size, type of home/building, geographic location of the home/building, demographic information of each of the one or more consumer loads.

20. One or more non-transitory computer storage media storing instructions that are operable, when executed by one or more computers, to cause said one or more computers to perform operations comprising:
- storing one or more priorities and one or more energy limits for one or more consumer loads in a computer memory;
- forecasting an amount of electrical energy available from a renewable energy system (RES) and an energy storage system (ESS) for a time period;
- allocating a first electrical energy amount to a first consumer load of the one or more consumer loads and a second electrical energy amount to a second consumer load of the one or more consumer loads based on the stored one or more priorities and the one or more energy limits and for the time period; and
- directing electrical energy from the RES or the ESS to the first and second consumer loads according to the allocated first electrical energy amount and second electrical energy amount.

* * * * *